US012623344B2

(12) United States Patent
Yin et al.

(10) Patent No.: US 12,623,344 B2
(45) Date of Patent: May 12, 2026

(54) METHOD FOR ROBOT ASSISTED MULTI-VIEW 3D SCANNING MEASUREMENT BASED ON PATH PLANNING

(71) Applicant: UNIVERSITY OF ELECTRONIC SCIENCE AND TECHNOLOGY OF CHINA, Chengdu (CN)

(72) Inventors: Chun Yin, Chengdu (CN); Yan Gao, Chengdu (CN); Zhongbao Yan, Chengdu (CN); Kai Chen, Chengdu (CN); Yuhua Cheng, Chengdu (CN); Xutong Tan, Chengdu (CN); Junyang Liu, Chengdu (CN)

(73) Assignee: UNIVERSITY OF ELECTRONIC SCIENCE AND TECHNOLOGY OF CHINA, Chengdu (CN)

( * ) Notice: Subject to any disclaimer, the term of this patent is extended or adjusted under 35 U.S.C. 154(b) by 258 days.

(21) Appl. No.: 18/140,784

(22) Filed: Apr. 28, 2023

(65) Prior Publication Data

US 2023/0339112 A1     Oct. 26, 2023

(30) Foreign Application Priority Data

Mar. 17, 2023    (CN) ......................... 202310261035.X
Mar. 24, 2023    (CN) ......................... 202310297593.1

(51) Int. Cl.
*G06F 17/00* (2019.01)
*B25J 9/16* (2006.01)
*B25J 19/02* (2006.01)

(52) U.S. Cl.
CPC ........... *B25J 9/1664* (2013.01); *B25J 9/1671* (2013.01); *B25J 9/1692* (2013.01); *B25J 19/021* (2013.01)

(58) Field of Classification Search
CPC ...... B25J 9/1664; B25J 9/1671; B25J 9/1692; B25J 19/021; G05B 2219/39057
(Continued)

(56) References Cited

U.S. PATENT DOCUMENTS 9,784,972  B2 *  10/2017  Aratani ................. G06T 19/006
10,084,971  B2    9/2018  Liu et al.
(Continued)

FOREIGN PATENT DOCUMENTS

JP         2020009464  A  *  1/2020

OTHER PUBLICATIONS

Deploying the Robot Operating System (ROS) for Complex Path Planning on Planar Surfaces (Year: 2021).*
(Continued)

*Primary Examiner* — Ronnie M Mancho
(74) *Attorney, Agent, or Firm* — Oliff PLC

(57) ABSTRACT

The present invention provides a method for robot assisted multi-view 3D scanning measurement based on path planning. Firstly, establishing a virtual simulation platform to complete the setting of measurement poses and measurement paths and perform the path evaluations of measurement paths, which improves the measurement efficiency and guarantees the measurement safety. Then, completing the preliminary hand-eye calibration based on the properties of Kronecker product, which reduces the system noise in the process of calibration and the error influence caused by the calculation, and the preliminary hand-eye calibration is optimized by establishing a reprojection error cost function as the fitness function of the particle swarm optimization algorithm, which further improves the accuracy of hand-eye calibration and guarantees the registration quality of single-view point cloud. Lastly, moving the robot in turn to the measurement poses of the planned measurement paths,
(Continued)

obtaining a single-view point cloud of the measured object and transforming it from the camera coordinate system to the robot base coordinate system to obtain a registered single-view point cloud based on the optimized hand-eye matrix. when registered single-view point clouds of all measurement poses are obtained, the points under the robot base coordinate system form a complete point cloud of the measured object, the 3D the measurement is completed.

1 Claim, 7 Drawing Sheets

(58) Field of Classification Search
USPC ......................................................... 700/259
See application file for complete search history.

(56) References Cited

U.S. PATENT DOCUMENTS

2019/0347525 A1* 11/2019 Liem ................... G06F 18/2193
2021/0166411 A1* 6/2021 Akdemir ................... G06T 7/33
2022/0182593 A1* 6/2022 Yin ........................... G06T 7/33
2023/0339112 A1* 10/2023 Yin ........................ B25J 19/021

OTHER PUBLICATIONS

Deploying the Robot Operating System (ROS) for Complex Path Planning on Planar Surfaces (Year: 2021) (Year: 2021).*

* cited by examiner

Establishing a hand-eye calibration equation    S3.1

Calculating the hand-eye matrix by using a singular value decomposition    S3.2

Based on minimizing a reprojection error, optimizing the hand-eye matrix by using a particle swarm optimization algorithm    S3.3

Performing a 3D measurement    S3.4

Structured light measuring
equipment

A Simulated object

Robot

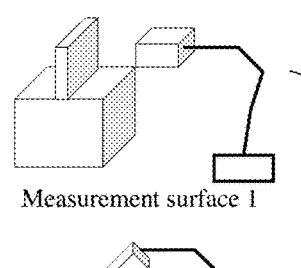

Measurement surface 1

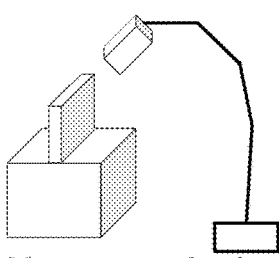

Measurement surface 2

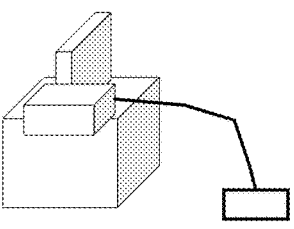

Measurement surface 3

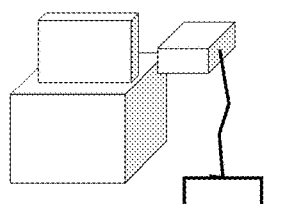

Measurement surface 4

Transforming the single-view point clouds of each measurement surface into robot base coordinate system to obtain a registered single-view point cloud

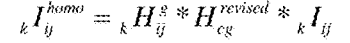

$$_{k}I_{ij}^{homo} = {}_{k}H_{ij}^{g} * H_{cg}^{revised} * {}_{k}I_{ij}$$

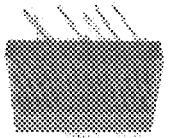

Registered single-view point cloud of measurement surface 1 in robot base coordinate system

Registered single-view point cloud of measurement surface 2 in robot base coordinate system

Registered single-view point cloud of measurement surface 3 in robot base coordinate system

Registered single-view point cloud of measurement surface 4 in robot base coordinate system

FIG. 9

METHOD FOR ROBOT ASSISTED MULTI-VIEW 3D SCANNING MEASUREMENT BASED ON PATH PLANNING

FIELD OF THE INVENTION

This application claims priorities under the Paris Convention to Chinese Patent Application No. 202310261035.X, filed on Mar. 14, 2023 and Chinese Patent Application No. 202310297593.1, filed on Mar. 24, 2023, the entirety of which is hereby incorporated by reference for all purposes as if fully set forth herein.

The present invention relates to the field of three dimensional (3D) scanning measurement, more particularly to a method for robot assisted multi-view 3D scanning measurement based on path planning.

BACKGROUND OF THE INVENTION

With the modernization of machinery manufacturing industry, higher requirements are put forward for the size of complex mechanical component. For large and complex mechanical component, 3D measuring equipment, such as three-coordinate measuring equipment or laser scanner is used in traditional 3D measurement, which is not only costly but also inefficient. In addition, the spaces of some parts of a large and complex component may be limited, which makes the field of view of the measuring equipment difficult to touch, so that the shape, namely 3D measurement cannot be completed.

The general solution for the 3D measurement of a large and complex mechanical component is to move a structured light measuring equipment to the pose corresponding to each angle of view, obtain multiple single-view point clouds of the large and complex mechanical component from multiple angles of views and register the multiple single-view point clouds to make the point cloud of the large and complex mechanical component complete.

The three-dimensional reconstruction technology based on industrial robot uses industrial robot as motion carrier and determines the pose relationship of the unit measurement coordinate systems of multiple angles of views through the constraints between the coordinate systems of axes of the robot, which make the characteristics, such as non-contact, high speed of visual measurement technology retained, and meanwhile the flexibility of the entire measurement system enhanced through the fast and flexible characteristic of the robot.

In factory, traditional method of generating a measurement path for a robot is usually through manual teaching. The measurement operator selects the path points one by one for a 3D measurement, which requires a higher technical level of the measurement operator and a higher familiarity of the field working environment. For the reason that the accuracy of single-view point cloud is greatly affected by the distance measurement of structured light measuring equipment, the measurement operator needs to manually measure the distance between the structured light measuring equipment and the large and complex mechanical component and judges whether it meets the shooting distance requirements. However, in some measurement conditions, for example, in high temperature environment, it is difficult to obtain the distance between the structured light measuring equipment and the large and complex mechanical component, how to ensure that the distance between the structured light measuring equipment and the large and complex mechanical component meets the requirement under each measurement pose has become a problem. So it is necessary to adopt an effective method to reduce the difficulty of operating a robot in 3D measurement and obtain higher quality single-view point clouds by precisely obtaining the distance between the structured light measuring equipment and the large and complex mechanical component.

At the same time, in current industrial robot related technology, a hand-eye calibration equation is established through a hand-eye calibration by acquiring and recording the camera information and robot attitude information of the robot under different poses, then a hand-eye relationship matrix can be obtained by linearly solving the hand-eye calibration equation. However, in the process of solving in above method, the only considered is minimizing the algebraic error, the influence of image noise on the hand-eye calibration accuracy is not considered, which leads to a lower calibration accuracy of the attitude relationship obtained by linear solving. The lower calibration accuracy of the attitude relationship will affect the accuracy and integrity of the three-dimensional measurement.

SUMMARY OF THE INVENTION

The present invention aims to overcome the deficiencies of the prior art and provides a method for robot assisted multi-view 3D scanning measurement based on path planning. One aim of the present invention is to improve the work efficiency of structured light measuring equipment to shorten the measurement time and provide good initial values to lighten the burden of the subsequent fine registration; the other aim of the present invention is to optimizing the accuracy of hand-eye calibration to guarantee the accuracy of registering multiple single-view point clouds, so as to improve the accuracy and integrity of 3D measurement.

To achieve these objectives, in accordance with the present invention, a method for robot assisted multi-view 3D scanning measurement based on path planning is provided, comprising:

(1). establishing a virtual simulation platform 1.1). based on a real measurement environment, establishing a virtual simulation platform on a computer with an open source robot operating system (ROS), and importing the description file of a robot into the virtual simulation platform to create a robot which is the same as the robot of real measurement environment; at the same time, on the virtual simulation platform, installing a structured light measuring equipment and a depth camera, which are the same as that of real measurement environment on the fixture of the robot's end flange;

1.2). simulating a measured object to obtain a simulated object, and placing the simulated object right in front of the robot and the structured light measuring equipment, determining multiple measurement surfaces of the simulated object and multiple measurement paths on each measurement surface for image taking of the simulated object by the structured light measuring equipment, where the $i^{th}$ measurement path of the $k^{th}$ measurement surface is denoted by $_kS_i$ $k=1, 2, \ldots, K$, $i=1, 2, \ldots, M_k$, K is the number of measurement surfaces, $M_k$ is the number of measurement paths of the $k^{th}$ measurement surface, and the $j^{th}$ measurement point, namely measurement pose of the $i^{th}$ measurement path of the $k^{th}$ measurement surface is denoted by $_kP_{ij}$, $j=1, 2, \ldots, N_k$, $N_k$ is the number of measurement poses of a measurement path of the $k^{th}$ measurement surface;

where the view field of the structured light measuring
equipment is a rectangle with a length of m cm and a
width of n cm, the outer rectangle of the $k^{th}$ measure-
ment surface is $_ka$ in length and $_kb$ in width, the
measurement paths are vertical strips along the length,
which satisfy the following constraints: any two adja-
cent measurement paths have a strip of common area,
the number $M_k$ of measurement paths of the $k^{th}$ mea-
surement surface is greater than or equal to $_ka/m$, the
number $N_k$ of measurement poses of a measurement
path of the $k^{th}$ measurement surface is greater than or
equal to $_kb/n$, the $j^{th}$ measurement pose $_kP_{ij}$ of the $i^{th}$
measurement path of the $k^{th}$ measurement surface is
obtained according to the constraints;

(2). planning measurement paths on the virtual simulation
platform 2.1). on the virtual simulation platform, to the $i^{th}$ mea-
surement path of the $k^{th}$ measurement surface, dragging
the end of the robot to a measurement pose $_kP_{ij}$, where
the measurement pose $_kP_{ij}$ is $(_kPx_{ij}, _kPy_{ij}, _kPz_{ij}, _kRx_{ij},$
$_kRy_{ij}, _kRz_{ij})$, $(_kPx_{ij}, _kPy_{ij}, _kPz_{ij})$ is the position coordi-
nate of the end of the robot, and $(_kRx_{ij}, _kRy_{ij}, _kRz_{ij})$ is
the attitude coordinate of the end of the robot;

2.2). taking a RGB-D image of the simulated object at the
measurement pose $_kP_{ij}$ by the depth camera and con-
verting the RGB-D image into a grayscale image, then
filtering out the background of the RGB-D image by
using threshold segmentation and extracting the con-
tour from the RGB-D image to obtain a minimum
circumscribed rectangle of the simulated object, then
traversing the depths of all pixels of the RGB-D image
within the minimum circumscribed rectangle to find out
the shortest distance $d_{min}$ between the simulated object
and the structured light measuring equipment and
recording the pixel coordinate (u,v) that corresponds to
the shortest distance $d_{min}$ on the RGB-D image, then
judging whether the shortest distance $d_{min}$ satisfies the
measurement range of the structured light measuring
equipment: $d_{min} \in [D-\delta, D+\delta]$, where D is the focal
length of the structured light measuring equipment for
camera calibration, $\delta$ is the allowable measurement
error range of the structured light measuring equip-
ment, if yes, then going to step 2.4), otherwise going to
step 2.3);

2.3). obtaining a corresponding spatial coordinate $(x_{(u,v)},$
$y_{(u,v)}, z_{(u,v)})$ of the pixel coordinate (u,v) through a
coordinate transformation, then determining a spatial
line according to the spatial coordinate $(x_{(u,v)}, y_{(u,v)},$
$z_{(u,v)})$ and the position coordinate $(_kPx_{ij}, _kPy_{ij}, _kPz_{ij})$ of
the end of the robot:

$$\frac{x - _k Px_{ij}}{x_{(u,v)} - _k Px_{ij}} = \frac{y - _k Py_{ij}}{y_{(u,v)} - _k Py_{ij}} = \frac{z - _k Pz_{ij}}{z_{(u,v)} - _k Pz_{ij}}$$

where (x,y,z) is a spatial coordinate on the spatial line;
then, finding a position coordinate from the position
coordinate $(_kPx_{ij}, _kPy_{ij}, _kPz_{ij})$ on and along the spatial
line to obtain a position coordinate $(_k\tilde{p}x_{ij}, _k\tilde{p}y_{ij}, _k\tilde{p}z_{ij})$,
which satisfies the following measurement conditions:

$$\begin{cases} \tilde{d}_{min} = \sqrt{(_k\tilde{p}x_{ij} - x_{(u,v)})^2 + (_k\tilde{p}y_{ij} - y_{(u,v)})^2 + (_k\tilde{p}z_{ij} - z_{(u,v)})^2} \\ \tilde{d}_{min} \in [D - \delta, D + \delta] \end{cases}$$

combining the position coordinate $(_k\tilde{p}x_{ij}, _k\tilde{p}y_{ij}, _k\tilde{p}z_{ij})$ with
the attitude coordinate $(_kRx_{ij}, _kRy_{ij}, _kRz_{ij})$ to form a
measurement pose $(_k\tilde{p}x_{ij}, _k\tilde{p}y_{ij}, _k\tilde{p}z_{ij}, _kRx_{ij}, _kRy_{ij}, _kRz_{ij})$
and updating the measurement pose $_kP_{ij}$ with the mea-
surement pose $(_k\tilde{p}x_{ij}, _k\tilde{p}y_{ij}, _k\tilde{p}z_{ij}, _kRx_{ij}, _kRy_{ij}, _kRz_{ij})$;

2.4). recording the measurement pose $_kP_{ij}$, the going to
step 2.1) for judging the next measurement pose $_kP_{i(j+1)}$
until the shortest distances of all measurement poses of
the measurement path $_kS_i$ are judged, then, going to step
2.5);

2.5). evaluating the measurement path $_kS_i$ 2.5.1). executing the measurement path $_kS_i$ on the virtual
simulation platform, where the robot will move con-
tinuously from the measurement pose $_kP_{i1}$ to the mea-
surement pose $_kP_{iN_k}$, then sampling and recording the
position $_k\dot{P}_{it}$ in equal time during the movement, all
positions $_k\dot{P}_{it}$, $t=0, 1, \ldots, T$ form a motion path $_k\dot{S}_i$,
where t is a serial number of sampling, T is the number
of samplings;

calculating the shortest distance $l_1$ between the starting
position $(_kPx_{i1}, _kPy_{i1}, _kPz_{i1})$ and the ending position
$(_kPx_{iJ}, _kPy_{iJ}, _kPz_{iN_k})$ of the measurement path $_kS_i$:

$$l_1 = \sqrt{\left(_k Px_{i1} - _k Px_{iN_k}\right)^2 + \left(_k Py_{i1} - _k Py_{iN_k}\right)^2 + \left(_k Pz_{i1} - _k Pz_{iN_k}\right)^2}$$

calculating the motion distance between the starting posi-
tion $(_k\dot{P}x_{i1}, _k\dot{P}y_{i1}, _k\dot{P}z_{i1})$ and the ending position $(_k\dot{P}x_{iT},$
$_k\dot{P}y_{iT}, _k\dot{P}z_{iT})$ of the motion path $_k\dot{S}_i$:

$$l_2 = \sum_{t=1}^{T-1} \sqrt{\left(_k\dot{P}x_{i(t+1)} - _k\dot{P}x_{it}\right)^2 + \left(_k\dot{P}y_{i(t+1)} - _k\dot{P}y_{it}\right)^2 + \left(_k\dot{P}z_{i(t+1)} - _k\dot{P}z_{it}\right)^2}$$

then obtaining a distance difference L, where $L=l_2-l_1$, and
creating an evaluation function $f_1(L)$, where $f_1(L)=$
$(\delta_1-L)/\delta_1$, $0 \le L \le \delta_1$, $\delta_1$ is a maximum error threshold;

2.5.2). finding a position $_k\dot{P}_{iw}$ which has the shortest
distance to the barycenter of the simulated object from
the motion path $_k\dot{S}_i$, where the shortest distance is
denoted by $l_3$, then creating an evaluation function
$f_2(l_3)$, where $f_2(l_3)$ $(l_3-\delta_2)/l_3$, $\delta_2$ is the shortest distance
which guarantee no collision between the structured
light measuring equipment and the simulated object;

2.5.3). creating an overall evaluation function $_kF_i$ for the
measurement path $_kS_i$, where $_kF_i=(0.5f_1(L)+$
$0.5F(l_3))*100$, then evaluating the measurement path
$_kS_i$ according to the overall evaluation function $_kF_i$, if
the overall evaluation function $_kF_i>g$, the measurement
path $_kS_i$ has passed the evaluation, then going to step
2.7), otherwise going to step 2.6), where g is a threshold
which is determined by measurement operator accord-
ing to an actual measurement scenario, and $0<g<100$;

2.6). traversing all measurement poses of the measure-
ment path $_kS_i$ to find a measurement pose $_kP_{is}$ which has
the shortest distance to position $_k\dot{P}_{iw}$, then moving the
robot to the measurement pose $_kP_{is}$, dragging the end of
the robot to manually increase the shortest distance $d_{min}$
between the simulated object and the structured light
measuring equipment, where the increase of the short-
est distance $d_{min}$ needs to satisfies the measurement
range of the structured light measuring equipment:
$d_{min} \in [D-\delta, D+\delta]$, replacing the measurement pose $_kP_{is}$
with the measurement pose after the increase of the shortest distance $d_{min}$ to complete the correction of the measurement path $_kS_i$, then going to step 2.7);

2.7). for each measurement path of each measurement surface, performing step 2.1) to step 2.6) to complete the simulation of planning of the measurement paths, converting the planned measurement paths into communication messages that can be recognized by robot and sending the communication messages from the virtual simulation platform to the robot of real measurement environment;

(3). measuring in real measurement environment 3.1). establishing a hand-eye calibration equation in the real measurement environment, installing a structured light measuring equipment on the fixture of a robot's end flange, operating the robot to move to the $i'^{th}$ measurement pose and taking an image of a corner of a checkerboard, namely a calibration board to obtain a calibration board image, then recording the pose information of the robot and the position $P_{i'}$ of the corner in camera coordinate system, for n' measurement poses, obtaining n' calibration board images, and their corresponding pose information of the robot and positions $P_{i'}$ of the corner in camera coordinate system;

obtaining the rotation matrix $R_{ci'}$ and the translation vector $T_{ci'}$ of the calibration board relative to the binocular camera of the structured light measuring equipment in each calibration board image according to the calibration method of Zhang, and then combining the rotation matrix $R_{ci'}$ and the translation vector $T_{ci'}$ into an extrinsic parameter matrix $H_{ci'}$, i'=1, 2, . . . , n', meanwhile, obtaining the rotation matrix $R_{gi'}$ and the translation vector $T_{gi'}$ of the robot's end flange relative to the base of the robot according to the measurement pose, then combining the rotation matrix $R_{gi'}$ and the translation vector $T_{gi'}$ into a robot pose matrix $H_{gi'}$, i'=1, 2, . . . , n', where:

$$H_{ci'} = \begin{bmatrix} R_{ci'} & T_{ci'} \\ 0 & 1 \end{bmatrix},$$

$$H_{gi'} = \begin{bmatrix} R_{gi'} & T_{gi'} \\ 0 & 1 \end{bmatrix};$$

establishing a hand-eye calibration equation based on the extrinsic parameter matrices $H_{cu'}$, $H_{cv'}$ and robot pose matrices $H_{gu'}$, $H_{gv'}$ of any two measurement poses:

$$[H_{gv'}^{-1}H_{gu'}]H_{cg} = H_{cg}[H_{cv'}H_{cu'}^{-1}]$$

where u', v' are serial numbers of any two measurement poses, u'≠v' and:

$$[H_{gv'}^{-1}H_{gu'}] = \begin{bmatrix} R_{gu',v'} & T_{gu',v'} \\ 0 & 1 \end{bmatrix},$$

$$H_{cg} = \begin{bmatrix} R_{cg} & T_{cg} \\ 0 & 1 \end{bmatrix} \text{ and}$$

$$[H_{cv'}H_{cu'}^{-1}] = \begin{bmatrix} R_{cu',v'} & T_{cu',v'} \\ 0 & 1 \end{bmatrix};$$

where $R_{gu',v'}$ is the rotation matrix of the matrix $$[H_{gv'}^{-1}H_{gu'}], T_{gu',v'}$$

is the translation vector of the matrix $$[H_{gv'}^{-1}H_{gu'}], R_{cg}$$

is the rotation matrix of the hand-eye matrix $H_{cg}$, $T_{cg}$ is the translation vector of the hand-eye matrix $H_{cg}$, $R_{cu',v'}$ is the rotation matrix of the matrix $$[H_{cv'}H_{cu'}^{-1}], T_{cu',v'}$$

is the translation vector of the matrix $$[H_{cv'}H_{cu'}^{-1}];$$

3.2). based on the properties of Kronecker product, transforming the hand-eye calibration equation into a least squares problem, and calculating the hand-eye matrix $H_{cg}$ by using a singular value decomposition establishing a linear equation set:

$$(R_{gu',v'} \otimes I - I \otimes R_{cu',v'}^T) \cdot vec(R_{cg}) = 0,$$

where I is a unit matrix, $\otimes$ is the operator of Kronecker product, vec is the operator of vectorization;

placing all matrices $$(R_{gu',v'} \otimes I - I \otimes R_{cu',v'}^T)$$

of all any two measurement poses by column to obtain a matrix R;

performing a singular value decomposition on the matrix R to obtaining matrix V, namely the right singular matrix of the matrix R, and taking out the 9 elements of last column of matrix V to revert to a matrix $\overline{R}_{cg}$ of 3×3;

performing a singular value decomposition on the matrix $\overline{R}_{cg}$, i.e.

$$\overline{R}_{cg} = U_R \sum\nolimits_R V_R^T,$$

where $U_R$ is the left singular matrix of the matrix $\overline{R}_{cg}$, $\Sigma_R$ is the singular value matrix of the matrix $\overline{R}_{cg}$, $V_R$ is the right singular matrix of the matrix $R_{cg}$, then obtaining the rotation matrix $$H_{cg}: R_{cg} = U_R V_R^T;$$

placing all matrices $(R_{gu',v'}-I)$ of all any two measurement poses by column to obtain a matrix $R_g$, placing all matrices $(R_{cg}T_{cu',v}-T_{gu',v})$ of all any two measurement poses by column to obtain a matrix T', then calculating the translation vector of the hand-eye matrix $$H_{cg}:T_{cg} = R_g^{-1}T'.$$

3.3). based on minimizing a reprojection error, optimizing the hand-eye matrix by using a particle swarm optimization algorithm 3.3.1). creating a particle swarm with population size of K', where the position and the velocity of the $k'^{th}$ particle are denoted by $p_{k'}$ and $v_{k'}$, respectively, then initializing the positions $p_{k'}$ and the velocities $v_{k'}$ of all K' particles:

$$p_k=H_{cg}$$

$$v_k=\text{rand}(v_{min}, v_{max})$$

where k'=1, 2, . . . ,K', $v_{min}$, $v_{max}$ are the upper threshold and the lower threshold of velocity at each iteration of particle, rand( ) is rand function;

3.3.2). establishing a reprojection error cost function as the fitness function of the particle swarm optimization algorithm:

$$\varphi(p_{k'}) = \sum_{i'=1, j' \neq i'}^{n'} \left\| P_{i'} - \frac{1}{s_{i'}}K * \exp\left[p_{k'}H_{gi'}H_{gi'}^{-1}p_{k'}^{-1}\right]_{3\times 4} P_{j'}\right\|_2^2$$

where $s_{i'}$ is the scale factor of the $i'^{th}$ measurement pose, K* is the intrinsic parameter matrix of the binocular camera, $\exp[\bullet]_{3\times 4}$ is an operator of choosing a submatrix of 3×4 of the left upper corner of the matrix in square bracket, $\| \|_2$ is a square-normal operator, $P_{j'}$ is the position of the corner of the checkerboard of any non-$i^{th}$ measurement pose in camera coordinate system;

3.3.3). according to the fitness function $\varphi(p_{k'})$, finding the position of the current individual extremum $$\min\{\varphi(p_{k'}), \varphi(p_{k'}^*)\}$$

of each particle and taking it as the historical optimal position $$p_{k'}^*,$$

finding the position of the global extremum $\min\{\varphi(p_{k'})$, k'=1, 2, . . . , K'\}, namely the position of the particle of the minimum value of fitness function and taking it as the global optimal position g*:

$$\begin{cases} p_{k'}^* \leftarrow \min\ \{\varphi(p_{k'}),\ \varphi(p_{k'})\} \\ g^* \leftarrow \min\ \{\varphi(p_{k'}),\ k' = 1, 2, \dots, K'\} \end{cases}$$

3.3.4). updating the velocity $v_{k'}$ and position $p_{k'}$ of each particle:

$$\begin{cases} v_{k'} = \omega v_{k'} + c_1 rand(0, 1)\times(p_{k'}^* - p_{k'}) + c_2 rand(0, 1)\times(g^* - p_{k'}) \\ p_{k'} = p_{k'} + v_{k'} \end{cases}$$

where $\omega$ is a inertia factor, $c_1$ and $c_2$ are acceleration factors;

returning step 3.3.3), until a termination condition is reached;

step 3.3.5). taking the global optimal position g* as the optimized hand-eye matrix, which is denoted by $$H_{cg}^{revised};$$

3.4). performing a 3D measurement 3.4.1). adjusting the binocular camera of the structured light measuring equipment so that it can clearly capture the measured object, the left and right cameras can be kept in the same horizontal position with a certain distance, and the binocular calibration can be completed; adjusting the robot so that it can carry the structured light measuring equipment to perform the 3D measurement and guarantee the full view of the measured object will be taken;

3.4.2). after receiving the planned measurement paths from the virtual simulation platform, moving the robot in turn to the measurement poses of the planned measurement paths;

3.4.3). for the measurement pose $_kP_{ij}$, calculating a pose matrix $$_kH_{ij}^g$$

from the coordinate system of the robot's end flange to the robot base coordinate system according the measurement pose $_kP_{ij}$, then obtaining a rigid body transformation matrix:

$$_kH_{ij}^{pcl} = {_kH_{ij}^g} * H_{cg}^{revised}$$

then obtaining a single-view point cloud $_kI_{ij}$ of the measured object through the binocular camera of the structured light measuring equipment and transforming it from the camera coordinate system to the robot base coordinate system to obtain a registered single-view point cloud $$_kI_{ij}^{homo}:{_kI_{ij}^{homo}} =_k H_{ij}^{pcl} *_k I_{ij}$$

when registered single-view point clouds of all measurement poses are obtained, the points under the robot base coordinate system form a complete point cloud of the measured object, the 3D the measurement is completed.

The objectives of the present invention are realized as follows:

In the present invention, firstly, based on a real measurement environment, establishing a virtual simulation platform on a computer with an open source robot operating system (ROS), then, under the prerequisite of guaranteeing the integrity of 3D measurement, completing the setting of measurement poses and measurement paths and performing the path evaluations of measurement paths on the virtual simulation platform, then, completing the preliminary hand-eye calibration based on the properties of Kronecker product, which reduces the system noise in the process of calibration and the error influence caused by the calculation, and the the preliminary hand-eye calibration is optimized by establishing a reprojection error cost function as the fitness function of the particle swarm optimization algorithm, which further improves the accuracy of hand-eye calibration and guarantees the registration quality of single-view point cloud, lastly, moving the robot in turn to the measurement poses of the planned measurement paths, obtaining a single-view point cloud of the measured object through the binocular camera of the structured light measuring equipment and transforming it from the camera coordinate system to the robot base coordinate system to obtain a registered single-view point cloud based on the optimized hand-eye matrix. when registered single-view point clouds of all measurement poses are obtained, the points under the robot base coordinate system form a complete point cloud of the measured object, the 3D the measurement is completed.

Meanwhile, the present invention has the following advantageous features and innovations:

The present invention adopts a virtual simulation platform to perform path planning, which effectively reduces the number of trial and error. In the virtual simulation platform, judges whether the distance from the structured light measuring equipment to the measured object satisfies the measurement range of the structured light measuring equipment, if not satisfied, finds a position which satisfy measurement conditions to update measurement pose to update the measurement pose, so the measurement accuracy is improved. In addition, an overall evaluation function is created for evaluating the measurement path, to the measurement path which does not satisfy the overall evaluation function, a measurement path correction is made to improve the measurement efficiency and guarantee the measurement safety.

BRIEF DESCRIPTION OF THE DRAWING

The above and other objectives, features and advantages of the present invention will be more apparent from the following detailed description taken in conjunction with the accompanying drawings, in which:

FIG. 9 is a diagram of the setting of different measurement surfaces of the measured object and corresponding registered single-view point clouds of measurement surfaces in example 1;

DETAILED DESCRIPTION OF THE PREFERRED EMBODIMENT

Figure 1:
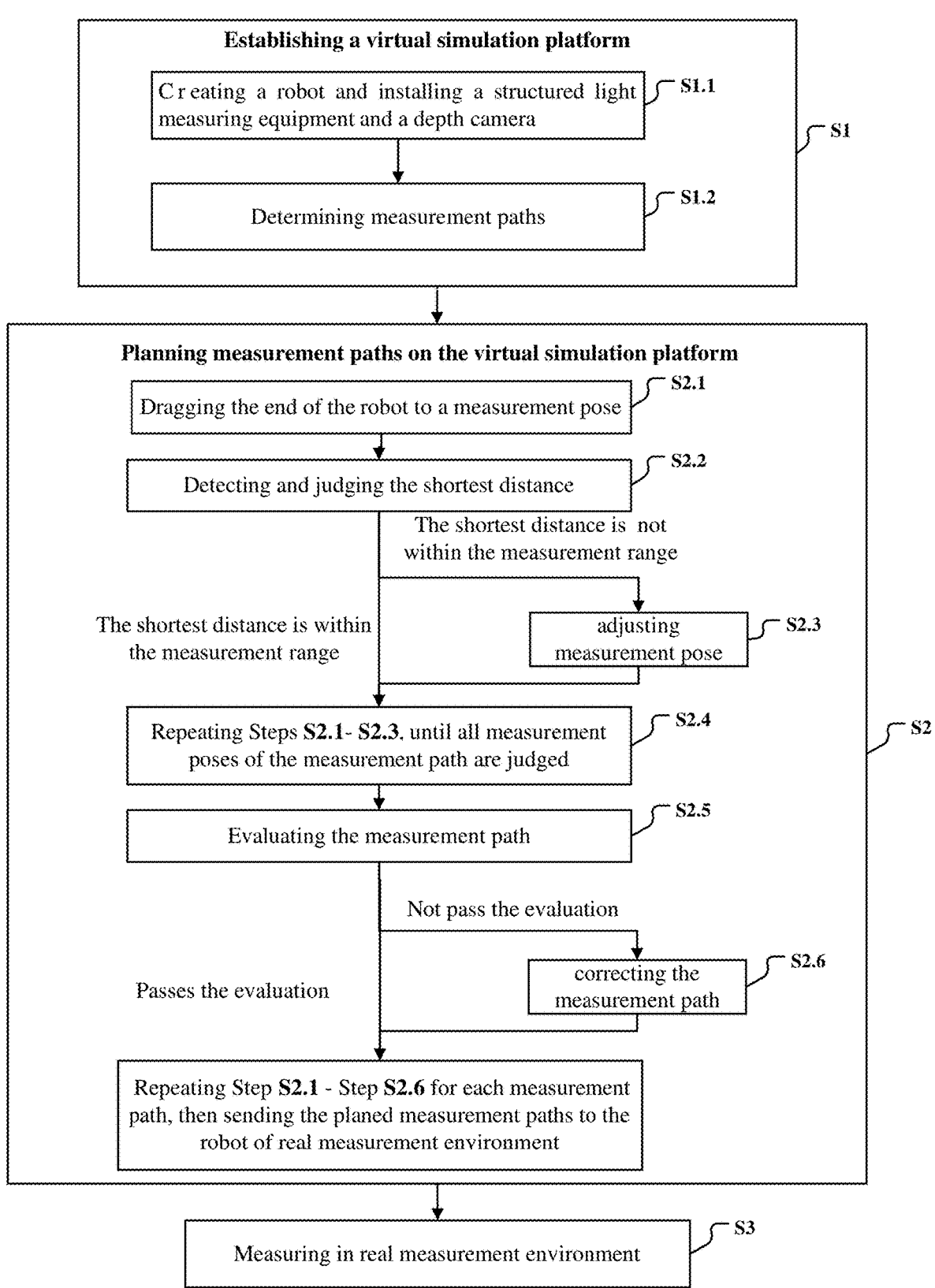
FIG. 1 is a flow diagram of a method for robot assisted multi-view 3D scanning measurement based on path planning in accordance with the present invention.

Hereinafter, preferred embodiments of the present invention will be described with reference to the accompanying drawings. It should be noted that the similar modules are designated by similar reference numerals although they are illustrated in different drawings. Also, in the following description, a detailed description of known functions and configurations incorporated herein will be omitted when it may obscure the subject matter of the present invention.

In one embodiment of the present invention, as shown in FIG. 1, a method for robot assisted multi-view 3D scanning measurement based on path planning in accordance with the present invention comprises the following steps:

Step S1: Establishing a Virtual Simulation Platform

Step S1.1: Creating a Robot and Installing a Structured Light Measuring Equipment and a Depth Camera Based on a real measurement environment, establishing a virtual simulation platform on a computer with an open source robot operating system (ROS), and importing the description file of a robot into the virtual simulation platform to create a robot which is the same as the robot of real measurement environment; at the same time, on the virtual simulation platform, installing a structured light measuring equipment and a depth camera, which are the same as that of real measurement environment on the fixture of the robot's end flange.

Where the description file of a robot is URDF (Universal Robot Description Format) description file, which includes the parameters of links, joints, kinematics and dynamic, visualization models, collision detection model.

Step S1.2: Determining Measurement Paths

Figure 2:
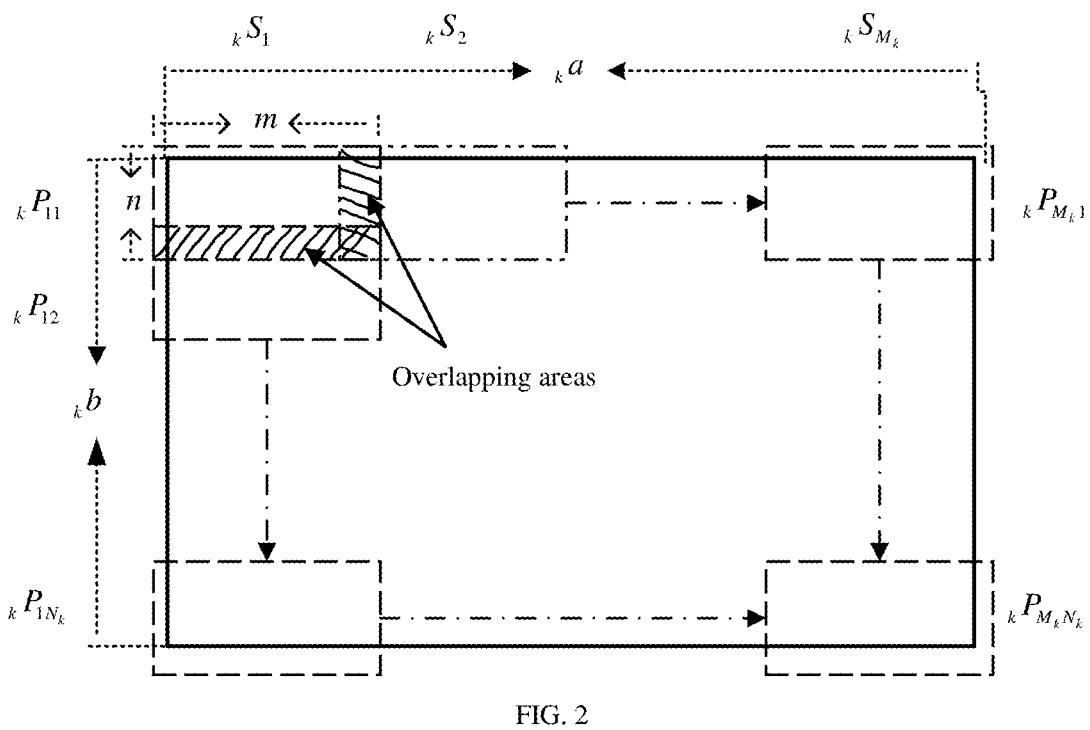
FIG. 2 is a diagram of determining measurement paths and measurement poses.

FIG. 2 is a diagram of determining measurement paths and measurement poses. In one embodiment of the present invention, as shown in FIG. 2, in order to obtain the more complete, more accurate 3D shape characteristics of the measured object and guarantee the adjacent point clouds have an overlapping area, we need to perform a simulation on the measured object:

Simulating a measured object to obtain a simulated object, and placing the simulated object right in front of the robot and the structured light measuring equipment, determining multiple measurement surfaces of the simulated object and multiple measurement paths on each measurement surface for image taking of the simulated object by the structured light measuring equipment, where the $i^{th}$ measurement path of the $k^{th}$ measurement surface is denoted by $_kS_i$, $k=1, 2, \ldots, K$, $i=1, 2, \ldots, M_k$, K is the number of measurement surfaces, $M_k$ is the number of measurement paths of the $k^{th}$ measurement surface, and the $j^{th}$ measurement point, namely measurement pose of the $i^{th}$ measurement path of the $k^{th}$ measurement surface is denoted by $_kP_{ij}$, $j=1, 2, \ldots, N_k$, $N_k$ is the number of measurement poses of a measurement path of the $k^{th}$ measurement surface.

Where the view field of the structured light measuring equipment is a rectangle with a length of m cm and a width of n cm, the outer rectangle of the $k^{th}$ measurement surface is $_k a$ in length and $_k b$ in width, the measurement paths are vertical strips along the length, which satisfy the following constraints: any two adjacent measurement paths have a strip of common area, the number $M_k$ of measurement paths of the $k^{th}$ measurement surface is greater than or equal to $_k a/m$, the number $N_k$ of measurement poses of a measurement path of the $k^{th}$ measurement surface is greater than or equal to $_k b/n$, the $j^{th}$ measurement pose $_k P_{ij}$ of the $i^{th}$ measurement path of the $k^{th}$ measurement surface is obtained according to the constraints. As shown in FIG. 2, thus overlapping areas exist in horizontal direction and vertical direction.

Step S2: Planning Measurement Paths on the Virtual Simulation Platform

Step S2.1: Dragging the End of the Robot to a Measurement Pose

On the virtual simulation platform, to the $i^{th}$ measurement path of the $k^{th}$ measurement surface, dragging the end of the robot to a measurement pose $_k P_{ij}$, where the measurement pose $_k P_{ij}$ is $(_k Px_{ij}, {}_k Py_{ij}, {}_k Pz_{ij}, {}_k Rx_{ij}, {}_k Ry_{ij}, {}_k Rz_{ij})$, $(_k Px_{ij}, {}_k Py_{ij}, {}_k Pz_{ij})$ is the position coordinate of the end of the robot, and $(_k Rx_{ij}, {}_k Ry_{ij}, {}_k Rz_{ij})$ is the attitude coordinate of the end of the robot.

Step S2.2: Detecting and Judging the Shortest Distance

Taking a RGB-D image of the simulated object at the measurement pose $_k P_{ij}$ by the depth camera and converting the RGB-D image into a grayscale image, then filtering out the background of the RGB-D image by using threshold segmentation and extracting the contour from the RGB-D image to obtain a minimum circumscribed rectangle of the simulated object, then traversing the depths of all pixels of the RGB-D image within the minimum circumscribed rectangle to find out the shortest distance $d_{min}$ between the simulated object and the structured light measuring equipment and recording the pixel coordinate (u,v) that corresponds to the shortest distance $d_{min}$ on the RGB-D image, then judging whether the shortest distance $d_{min}$ satisfies the measurement range of the structured light measuring equipment: $d_{min} \in [D-\delta, D+\delta]$, where D is the focal length of the structured light measuring equipment for camera calibration, $\delta$ is the allowable measurement error range of the structured light measuring equipment, if yes, then going to Step S2.4, otherwise going to Step S2.3.

Step S2.3: Adjusting Measurement Pose

Obtaining a corresponding spatial coordinate $(x_{(u,v)}, y_{(u,v)}, z_{(u,v)})$ of the pixel coordinate (u,v) through a coordinate transformation, then determining a spatial line according to the spatial coordinate $(x_{(u,v)}, y_{(u,v)}, z_{(u,v)})$ and the position coordinate $(_k Px_{ij}, {}_k Py_{ij}, {}_k Pz_{ij})$ of the end of the robot:

$$\frac{x -_k Px_{ij}}{x_{(u,v)} -_k Px_{ij}} = \frac{y -_k Py_{ij}}{y_{(u,v)} -_k Py_{ij}} = \frac{z -_k Pz_{ij}}{z_{(u,v)} -_k Pz_{ij}}$$

Where (x,y,z) is a spatial coordinate on the spatial line.

Then, finding a position coordinate from the position coordinate $(_k Px_{ij}, {}_k Py_{ij}, {}_k Pz_{ij})$ on and along the spatial line to obtain a position coordinate $(_k \tilde{p}x_{ij}, {}_k \tilde{p}y_{ij}, {}_k \tilde{p}z_{ij})$, which satisfies the following measurement conditions:

$$\begin{cases} \tilde{d}_{min} = \sqrt{\left(_k\tilde{p}x_{ij} - x_{(u,v)}\right)^2 + \left(_k\tilde{p}y_{ij} - y_{(u,v)}\right)^2 + \left(_k\tilde{p}z_{ij} - z_{(u,v)}\right)^2} \\ \tilde{d}_{min} \in [D - \delta, D + \delta] \end{cases}$$

Combining the position coordinate $(_k\tilde{p}x_{ij}, {}_k\tilde{p}y_{ij}, {}_k\tilde{p}z_{ij})$ with the attitude coordinate $(_k Rx_{ij}, {}_k Ry_{ij}, {}_k Rz_{ij})$ to form a measurement pose $(_k\tilde{p}x_{ij}, {}_k\tilde{p}y_{ij}, {}_k\tilde{p}z_{ij}, {}_k Rx_{ij}, {}_k Ry_{ij}, {}_k Rz_{ij})$ and updating the measurement pose $_k P_{ij}$ with the measurement pose $(_k\tilde{p}x_{ij}, {}_k\tilde{p}y_{ij}, {}_k\tilde{p}z_{ij}, {}_k Rx_{ij}, {}_k Ry_{ij}, {}_k Rz_{ij})$.

Step S2.4: Repeating Steps S2.1-S2.3, Until all Measurement Poses of the Measurement Path are Judged recording the measurement pose $_k P_{ij}$, the going to Step S2.1 for judging the next measurement pose $_k P_{i(j+1)}$ until the shortest distances of all measurement poses of the measurement path $_k S_i$ are judged, then, going to Step S2.5.

Step S2.5: Evaluating the Measurement Path $_k S_i$

Step S2.5.1: executing the measurement path $_k S_i$ on the virtual simulation platform, where the robot will move continuously from the measurement pose $_k P_{i1}$ to the measurement pose $_k P_{iN_k}$, then sampling and recording the position $_k \dot{P}_{it}$ in equal time during the movement, all positions $_k \dot{P}_{it}$, $t=0, 1, \ldots, T$ form a motion path $_k \dot{S}_i$, where t is a serial number of sampling, T is the number of samplings.

Calculating the shortest distance $l_1$ between the starting position $(_k Px_{i1}, {}_k Py_{i1}, {}_k Pz_{i1})$ and the ending position $(_k Px_{iJ}, {}_k Py_{iJ}, {}_k Pz_{iN_k})$ of the measurement path $_k S_i$:

$$l_1 = \sqrt{\left(_k Px_{i1} -_k Px_{iN_k}\right)^2 + \left(_k Py_{i1} -_k Py_{iN_k}\right)^2 + \left(_k Pz_{i1} -_k Pz_{iN_k}\right)^2}$$

Calculating the motion distance between the starting position $$(_k\dot{P}x_{i1}, {}_k\dot{P}y_{i1}, {}_k\dot{P}z_{i1})$$

and the ending position $$(_k\dot{P}x_{iT}, {}_k\dot{P}y_{iT}, {}_k\dot{P}z_{iT})$$

of the motion path $$_k\dot{S}_i:$$

$$l_2 = \sum_{t=1}^{T-1} \sqrt{\left(_k\dot{P}x_{i(t+1)} -_k\dot{P}x_{it}\right)^2 + \left(_k\dot{P}y_{i(t+1)} -_k\dot{P}y_{it}\right)^2 + \left(_k\dot{P}z_{i(t+1)} -_k\dot{P}z_{it}\right)^2}$$

Then obtaining a distance difference L, where $L=l_2-l_1$, and creating an evaluation function $f_1(L)$, where $f_1(L)=(\delta_1 - L)/\delta_1$, $0 \leq L \leq \delta_1$, $\delta_1$ is a maximum error threshold.

Step S2.5.2: finding a position $$_k\dot{P}_{iw}$$

which has the shortest distance to the barycenter of the simulated object from the motion path $$_k\hat{S}_i,$$

where the shortest distance is denoted by $l_3$, then creating an evaluation function $f_2(l_3)$, where $f_2(l_3)=(l_3-\delta_2)/l_3$, $\delta_2$ is the shortest distance which guarantee no collision between the structured light measuring equipment and the simulated object.

Step S2.5.3: creating an overall evaluation function $_kF_i$ for the measurement path $_kS_i$, where $_kF_i=(0.5f_1(L)+0.5F(l_3))$ *100, then evaluating the measurement path $_kS_i$ according to the overall evaluation function $_kF_i$, if the overall evaluation function $_kF_i$>g, the measurement path $_kS_i$ has passed the evaluation, then going to Step S2.7, otherwise going to Step S2.6, where g is a threshold which is determined by measurement operator according to an actual measurement scenario, and 0<g<100.

Step S2.6: Correcting the Measurement Path traversing all measurement poses of the measurement path $_kS_i$ to find a measurement pose $_kP_{is}$ which has the shortest distance to position $$_k\dot{P}_{iw},$$

then moving the robot to the measurement pose $_kP_{is}$, dragging the end of the robot to manually increase the shortest distance $d_{min}$, between the simulated object and the structured light measuring equipment, where the increase of the shortest distance $d_{min}$ needs to satisfies the measurement range of the structured light measuring equipment: $d_{min}\in$ [D−δ,D+δ], replacing the measurement pose $_kP_{is}$ with the measurement pose after the increase of the shortest distance $d_{min}$ to complete the correction of the measurement path $_kS_i$, then going to Step S2.7.

Step S2.7: Repeating Step S2.1-Step S2.6 for Each Measurement Path, then Sending the Planned Measurement Paths to the Robot of Real Measurement Environment For each measurement path of each measurement surface, performing Step S2.1 to Step S2.6 to complete the simulation of planning of the measurement paths, converting the planned measurement paths into communication messages that can be recognized by robot and sending the communication messages from the virtual simulation platform to the robot of real measurement environment.

Step S3: Measuring in Real Measurement Environment

Figure 3:
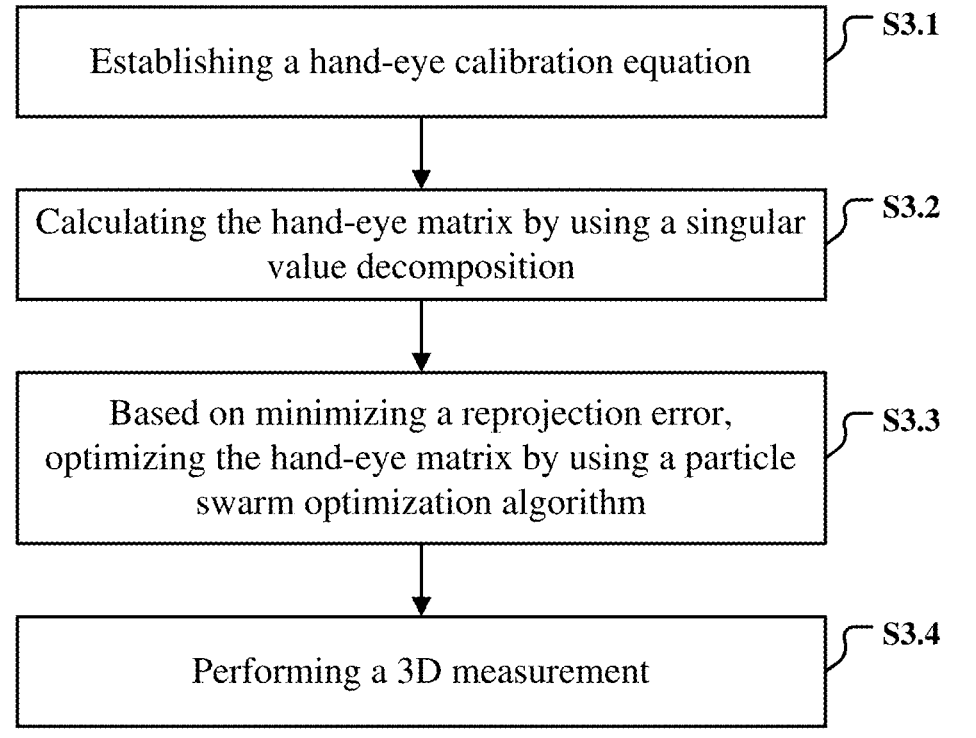
FIG. 3 is a flow diagram of measuring in real measurement environment in accordance with the present invention.

As shown in FIG. 3, the measuring in real measurement environment comprises the following steps:

Step S3.1: Establishing a Hand-Eye Calibration Equation

Figure 4:
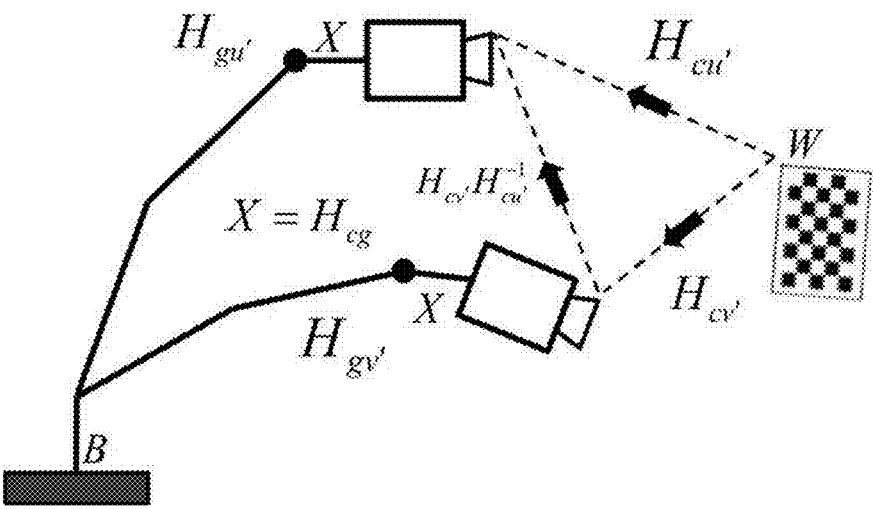
FIG. 4 is a diagram of establishing a hand-eye calibration equation.

In the real measurement environment, as shown in FIG. 4, installing a structured light measuring equipment on the fixture of a robot's end flange, operating the robot to move to the $i'^{th}$ measurement pose and taking an image of a corner of a checkerboard, namely a calibration to obtain a board images, then recording the pose information of the robot and the position $P_{i'}$ of the corner in camera coordinate system, for n' measurement poses, obtaining n' calibration board images, and their corresponding pose information of the robot and positions $P_{i'}$ of the corner in camera coordinate system.

Obtaining the rotation matrix $R_{ci'}$ and the translation vector $T_{ci'}$ of the calibration board relative to the binocular camera of the structured light measuring equipment in each calibration board image according to the calibration method of Zhang, and then combining the rotation matrix $R_{ci'}$ and the translation vector $T_{ci'}$ into an extrinsic parameter matrix $H_{ci'}$, i'=1, 2, . . . , n', meanwhile, obtaining the rotation matrix $R_{gi'}$ and the translation vector $T_{gi'}$ of the robot's end flange relative to the base of the robot according to the measurement pose, then combining the rotation matrix $R_{gi'}$ and the translation vector $T_{gi'}$ into a robot pose matrix $H_{gi'}$, i'= 1, 2, . . . , n', where:

$$H_{ci'} = \begin{bmatrix} R_{ci'} & T_{ci'} \\ 0 & 1 \end{bmatrix}, H_{gi'} = \begin{bmatrix} R_{gi'} & T_{gi'} \\ 0 & 1 \end{bmatrix}$$

For the reason that the relative pose relation between the base of the robot and the checkerboard (calibration board) is constant and the relative pose relation between the binocular camera and the robot's end flange is constant, combining the coordinate transformation relation between the extrinsic parameter matrix of the binocular camera and the robot pose matrix, we can obtain the following relation for any two measurement poses:

$$H_{gu'}H_{cg}H_{cu'}=H_{BW}=H_{BW}=H_{gv'}H_{cg}H_{cv'}$$

Namely:

$$H_{gu'}H_{cg}H_{cu'}=H_{gv'}H_{cg}H_{cv'}$$

Performing a matrix transformation, namely multiplying the front of left side by matrix $$H_{gv'}^{-1}$$

and the rear of right side by matrix $$H_{cu'}^{-1},$$

we can obtain the following equation:

$$H_{gv'}^{-1}H_{gu'}H_{cg} = H_{cg}H_{cv'}H_{cu'}^{-1}$$

Namely, establishing a hand-eye calibration equation based on the extrinsic parameter matrices $H_{cu'}$, $H_{cv'}$ and robot pose matrices $H_{gu'}$, $H_{gv'}$ of any two measurement poses:

$$[H_{gv'}^{-1}H_{gu'}]H_{cg} = H_{cg}[H_{cv'}H_{cu'}^{-1}]$$

where u', v' are serial numbers of any two measurement poses, u'≠v' and:

$$[H_{gv'}^{-1}, H_{gu'}] = \begin{bmatrix} R_{gu',v'} & T_{gu',v'} \\ 0 & 1 \end{bmatrix},$$

$$H_{cg} = \begin{bmatrix} R_{cg} & T_{cg} \\ 0 & 1 \end{bmatrix} \text{ and}$$

-continued $$[H_{cv'}H_{cu'}^{-1}] = \begin{bmatrix} R_{cu',v'} & T_{cu',v'} \\ 0 & 1 \end{bmatrix};$$

where $R_{gu',v'}$ is the rotation matrix of the matrix $$[H_{gv'}^{-1}H_{gu'}], \; T_{gu',v'}$$

is the translation vector of the matrix $$[H_{gv'}^{-1}H_{gu'}], \; R_{cg}$$

is the rotation matrix of the hand-eye matrix $H_{cg}$, $T_{cg}$ is the translation vector of the hand-eye matrix $H_{cg}$, $R_{cu',v'}$ is the rotation matrix of the matrix $$[H_{cv'}H_{cu'}^{-1}], \; T_{cu',v'}$$

is the translation vector of the matrix $$[H_{cv'}H_{cu'}^{-1}].$$

Letting $$A = H_{gv'}^{-1}H_{gu'}, \; B = H_{cv'}H_{cu'}^{-1}, \; X = H_{cg},$$

then hand-eye calibration equation can be expressed as:

$$AX=XB$$

$$C_n^2$$

hand-eye calibration equation can be established by the n' pluralities of calibration data.

Step S3.2: Calculating the Hand-Eye Matrix by Using a Singular Value Decomposition based on the properties of Kronecker product, transforming the hand-eye calibration equation into a least squares problem, and calculating the hand-eye matrix $H_{cg}$ by using a singular value decomposition Based on the properties of Kronecker product, expanding the hand-eye calibration AX=BX, a homogeneous equation can be obtained:

$$AX = XB$$

$$[H_{gv'}^{-1}, H_{gu'}]H_{cg} = H_{cg}[H_{cv'}H_{cu'}^{-1}]$$

$$\begin{bmatrix} R_{gu',v'} & T_{gu',v'} \\ 0 & 1 \end{bmatrix}\begin{bmatrix} R_{cg} & T_{cg} \\ 0 & 1 \end{bmatrix} = \begin{bmatrix} R_{cg} & T_{cg} \\ 0 & 1 \end{bmatrix}\begin{bmatrix} R_{cu',v'} & R_{gu',v'} \\ 0 & 1 \end{bmatrix}$$

$$\begin{bmatrix} R_{gu',v'}R_{cg} & R_{gu',v'}T_{cg}+T_{cu',v'} \\ 0 & 1 \end{bmatrix} = \begin{bmatrix} R_{cg}R_{cu',v'} & R_{cg}T_{cu',v'}+T_{cg} \\ 0 & 1 \end{bmatrix}$$

Namely Formula 1 and formula 2:

$$\begin{cases} R_{gu',v'}R_{cg} = R_{cg}R_{cu',v'} & \text{Formula 1} \\ R_{gu',v'}T_{cg} + T_{gu',v'} = R_{cg}R_{cu',v'} + T_{cg} & \text{Formula 2} \end{cases}$$

Where $R_{cu',v}$, $R_{cg}$, $R_{gu',v'}$ are rotation matrices and belong to a special orthogonal group and are closed in multiplication.

Performing the following transformations on Formula 1:

$$R_{gu',v}R_{cg}I=IR_{cg}R_{cu',v'}$$

$$vec(R_{gu',v}R_{cg}I)=vec(IR_{cg}R_{cu',v'})$$

$$(R_{gu',v}\otimes I^T)vec(R_{cg})=(I\otimes R^T_{cu',v})vec(R_{cg})$$

$$(R_{gu',v}\otimes I - I\otimes R^T_{cu',v})vec(R_{cg})=0$$

Then obtained:

$$(R_{gu',v}\otimes I - I\otimes R^T_{cu',v})vec(R_{cg})=0$$

Where I is a unit matrix, $\otimes$ is the operator of Kronecker product, vec is the operator of vectorization.

So a linear equation of Cx=0 is obtained, thus we can transform the linear equation into a least squares problem by using singular value decomposition (SVD). For:

$$(R_{gu,v}\otimes I - I\otimes R^T_{cu,v})=U\Sigma V^T, U^T U = V^T V = I, \Sigma = \text{diag}(\sigma_1,$$
$$\sigma_2, \ldots, \sigma_9), \; \sigma_1 \geq \sigma_2 \geq \ldots \geq \sigma_9 \geq 0$$

we can obtain the following least squares problem:

$$\min\left\|\left(R_{gu,v}\otimes I - I\otimes R^T_{cu,v}\right)\cdot vec(R_{cg})\right\|_2^2 =$$
$$\min\left\|U\sum V^T vec(R_{cg})\right\|_2^2 = \min\left\|\sum V^T vec(R_{cg})\right\|_2^2$$
$$\text{s.t.}\|vec(R_{cg})\|_2 = 1$$

Then obtained:

$$\min\left\|\sum \cdot V^T vec(R_{cg})\right\|_2^2$$
$$\text{s.t.}\|vec(R_{cg})\|_2 = 1$$

Now the primal problem is converted into:

$$\min\left(V^T vec(R_{cg})\right)^T \sum\nolimits^T \sum\left(V^T vec(R_{cg})\right)_2^2 = \min|y^T \sum\nolimits^T \sum y|_2^2$$

Where $$y^T\sum\nolimits^T\sum y = \sigma_1^2 y_1^2 + \sigma_2^2 y_2^2 + \ldots + \sigma_9^2 y_9^2, \; \sigma_1 \geq \sigma_2 \geq \ldots \geq \sigma_9 \geq 0.$$

For there has a constraint of $\|y\|_2=1$, the minimal solution is y=[0 0 1]$^T$, namely, the solution of Cx=0 is the last column of the matrix V:

$$vec(R_{cg}) = Vy = [v_1 \;\; v_2 \;\; \ldots \;\; v_9]\begin{bmatrix} 0 \\ 0 \\ \vdots \\ 1 \end{bmatrix} = v_9$$

Therefore, the calculation of the hand-eye matrix $H_{cg}$ in the present invention is:

Firstly, establishing a linear equation set: $(R_{gu',v} \otimes I - I \otimes R^T_{cu',v}) \cdot \text{vec}(R_{cg})=0$, where I is a unit matrix, $\otimes$ is the operator of Kronecker product, vec is the operator of vectorization;

placing all matrices $(R_{gu',v} \otimes I - I \otimes R^T_{cu',v})$ of all any two measurement poses by column to obtain a matrix R;

performing a singular value decomposition on the matrix R to obtaining matrix V, namely the right singular matrix of the matrix R, and taking out the 9 elements of last column of matrix V to revert to a matrix $\overline{R}_{cg}$ of $3 \times 3$;

performing a singular value decomposition on the matrix $$\overline{R}_{cg} = U_R \sum\nolimits_R V_R^T,$$

where $U_R$ is the left singular matrix of the matrix $\overline{R}_{cg}$, $\Sigma_R$ is the singular value matrix of the matrix $\overline{R}_{cg}$, $V_R$ is the singular matrix of the matrix $\overline{R}_{cg}$, then obtaining the rotation matrix $R_{cg}$ of the hand-eye matrix $$H_{cg}: R_{cg} = U_R V_R^T.$$

So the rotation matrix $R_{cg}$ can be calculated from Formula 1. In order to guarantee the Unit orthogonality, the rotation matrix $R_{cg}$ has been Orthogonalized by adopting Rodrigues' rotation formula, as to eliminating the influence of measurement noise. Among Rodrigues' rotation formula, $\Sigma_R$ can reflect the quality of the calibration to a certain extent. For good calibration, all elements of $\Sigma_R$ should be very close, even completely equal.

Lastly, through above-mentioned Formula 2, we can obtain:

$$R_{gu',v}T_{cg}+T_{gu',v}=R_{cg}T_{cu',v}+T_{cg}$$

$$(R_{gu',v}-I)T_{cg}=R_{cg}T_{cu',v}-T_{gu',v}$$

Placing all matrices $(R_{gu',v}-I)$ of all any two measurement poses by column to obtain a matrix $R_g$, placing all matrices $(R_{cg}T_{cu',v}-T_{gu',v})$, of all any two measurement poses by column to obtain a matrix T', then calculating the translation vector of the hand-eye matrix $H_{cg}$: $T_{cg}=R_g^{-1}T'$.

Thus, the rotation and translation matrix of the binocular camera coordinate system to the robot's end flange coordinate system, the hand-eye matrix $H_{cg}$ is calculated and taken as the initial position of the subsequent particle swarm optimization algorithm.

Step S3.3: Based on Minimizing a Reprojection Error, Optimizing the Hand-Eye Matrix by Using a Particle Swarm Optimization Algorithm Step S3.3.1: Creating a Particle Swarm and Taking the Hand-Eye Matrix as Initial Positions of all Particles Creating a particle swarm with population size of K', where the position and the velocity of the $k'^{th}$ particle are denoted by $p_{k'}$ and $v_{k'}$, respectively, then initializing the positions $p_{k'}$ and the velocities $v_{k'}$ of all K' particles:

$$p_{k'}=H_{cg}$$

$$v_{k'}=\text{rand}(v_{min}, v_{max})$$

where k'=1, 2, . . . ,K', $v_{min}$, $v_{max}$ are the upper threshold and the lower threshold of velocity at each iteration of particle, rand( ) is rand function;

Step S3.3.2: Establishing a Reprojection Error Cost Function as the Fitness Function of the Particle Swarm Optimization Algorithm:

$$\varphi(p_{k'}) = \sum_{i'=1,j' \neq i'}^{n'} \left\| P_{i'} - \frac{1}{s_{i'}}K^*\exp\left[p_{k'}H_{gj'}H_{gi'}^{-1}P_{k'}^{-1}\right]_{3 \times 4}P_{j'}\right\|_2^2$$

where $s_{i'}$ is the scale factor of the $i'^{th}$ measurement pose, $K^*$ is the intrinsic parameter matrix of the binocular camera, $\exp [\bullet]_{3 \times 4}$ is an operator of choosing a submatrix of $3 \times 4$ of the left upper corner of the matrix in square bracket, $\| \ \|_2$ is a square-normal operator, $P_{j'}$ is the position of the corner of the checkerboard of any non-$i'^{th}$ measurement pose in camera coordinate system.

$P=[x,y,z]^T$ is the position of a corner of the checkerboard (calibration board) in the world coordinate system W, B is the robot base coordinate system, $P_{j'}$ is the position of the corner of the checkerboard of the $j'^{th}$ measurement pose in camera coordinate system. Their relationship can be express as:

$$\begin{bmatrix} P_{j'} \\ 1 \end{bmatrix} = H_{cj'}\begin{bmatrix} P \\ 1 \end{bmatrix}$$

As shown in FIG. 2, $P_{i'}$ is the position of the corner of the checkerboard of the $i'^{th}$ measurement pose in camera coordinate system. Thus we can transform the position $P_{j'}$ into the position $P_{i'j'}$ under the $i'^{th}$ measurement pose, and according to the following hand-eye relationship:

$$H_{gi'}'XH_{ci'}' = H_{cj'}'XH_{gj'}'$$

$$H_{ci'}'H_{cj'}^{-1} = XH_{gj'}'H_{gi'}^{-1}X^{-1}$$

We can obtain the following expression of the position $P_{i'j'}$:

$$\begin{bmatrix} P_{i'j'} \\ 1 \end{bmatrix} = H_{ci'}'H_{cj'}^{-1}\begin{bmatrix} P_{j'} \\ 1 \end{bmatrix} = XH_{gj'}'H_{gi'}^{-1}X^{-1}\begin{bmatrix} P_{j'} \\ 1 \end{bmatrix}$$

where $X=H_{cg}$.

We can project the position $P_{i'j'}$ to the imagine from the $i'^{th}$ measurement pose by using the calibration parameters of the binocular camera and obtain a image coordinate $$P_{i'j'}'.$$

Namely:

$$P_{i'j'}' = \frac{1}{s_{i'}}K^*P_{i'j'}$$

$$P_{i'j'}' = \frac{1}{s_{i'}}K^*\exp\left[XBX^{-1}\right]_{3 \times 4}\begin{bmatrix} P_{j'} \\ 1 \end{bmatrix}$$

where $s_{i'}$ is the scale factor of the $i'^{th}$ measurement pose, $K^*$ is the intrinsic parameter matrix of the binocular camera, exp[•]$_{3\times4}$ is an operator of choosing a submatrix of 3×4 of the left upper corner of the matrix in square bracket.

Denoting the reprojection error of the position $P_{ij'}$ as err, the reprojection error of the position $P_{ij'}$ is:

$$err = |P_{i'} - P'_{i'j'}|^2_2$$

Substituting the expression of the position $P_{ij'}$, we can obtain:

$$err = \left\| P_{i'} - \frac{1}{s_{i'}} K^* \exp[XBX^{-1}]_{3\times4} P_{j'} \right\|^2_2$$

Generalized to the n' pluralities of calibration board images, we can obtain a reprojection error cost function:

$$err^* = \sum_{i=1, j\neq i}^{n} \left\| P_i - \frac{1}{s_{i'}} K \exp[XBX^{-1}]_{3\times4} P_j \right\|^2_2$$

Taking the reprojection error cost function err* as the fitness function $\varphi(p_{k'})$ of the particle swarm optimization algorithm to perform an iteration, we can obtain the optimized hand-eye matrix $$H_{cg}^{revised}.$$

Step S3.3.3: according to the fitness function $\varphi(p_{k'})$, finding the position of the current individual extremum $$\min\{\varphi(p_{k'}), \varphi(p_{k'}^*)\}$$

of each particle and taking it as the historical optimal position $$p_{k'}^*$$

finding the position of the global extremum min $\{\varphi(p_{k'}),$ k'=1, 2, . . . , K'}, namely the position of the particle of the minimum value of fitness function and taking it as the global optimal position g*:

$$\begin{cases} p_k^* \leftarrow \min\{\varphi(p_k), \varphi(p_k^*)\} \\ g^* \leftarrow \min\{\varphi(p_k), k=1, 2, \dots, K\} \end{cases}$$

Step S3.3.4: updating the velocity $v_{k'}$ and position $p_{k'}$ of each particle:

$$\begin{cases} v_{k'} = \omega v_{k'} + c_1 rand(0, 1)\times(p_k^* - p_{k'}) + c_2 rand(0, 1)\times(g^* - p_{k'}) \\ p_{k'} = p_{k'} + v_{k'} \end{cases}$$

where $\omega$ is a inertia factor, $c_1$ and $c_2$ are acceleration factors;

returning Step S3.3.3, until a termination condition is reached;

Step S3.3.5: taking the global optimal position g* as the optimized hand-eye matrix, which is denoted by $$H_{cg}^{revised};$$

Step S3.4: Performing a 3D Measurement

Figure 5:
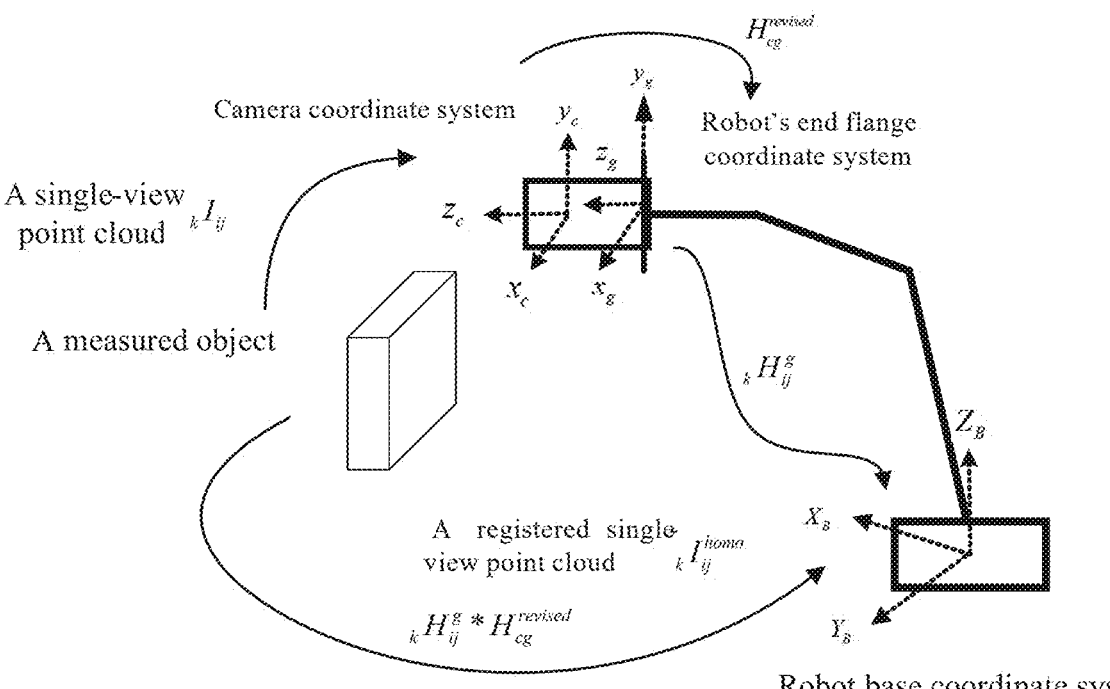
FIG. 5 is a diagram of registering a single-view point cloud.

Step S3.4.1: adjusting the binocular camera of the structured light measuring equipment so that it can clearly capture the measured object, the left and right cameras can be kept in the same horizontal position with a certain distance, and the binocular calibration can be completed; adjusting the robot so that it can carry the structured light measuring equipment to perform the 3D measurement and guarantee the full view of the measured object will be taken;

Step S3.4.2: after receiving the planned measurement paths from the virtual simulation platform, moving the robot in turn to the measurement poses of the planned measurement paths;

Step S3.4.3: as shown in FIG. 5, for the measurement pose $$_kP_{ij},$$

calculating a pose matrix $$_kH_{ij}^g$$

from the coordinate system of the robot's end flange to the robot base coordinate system according the measurement pose $_kP_{ij}$, then obtaining a rigid body transformation matrix:

$$_kH_{ij}^{pcl} = {_kH_{ij}^g} * H_{cg}^{revised}$$

then obtaining a single-view point cloud $_kI_{ij}$ of the measured object through the binocular camera of the structured light measuring equipment and transforming it from the camera coordinate system to the robot base coordinate system to obtain a registered single-view point cloud $$_kI_{ij}^{homo}: {_kI_{ij}^{homo}} = {_kH_{ij}^{pcl}} * {_kI_{ij}}$$

when registered single-view point clouds of all measurement poses are obtained, the points under the robot base coordinate system form a complete point cloud of the measured object, the 3D the measurement is completed.

Example 1

Figure 6:
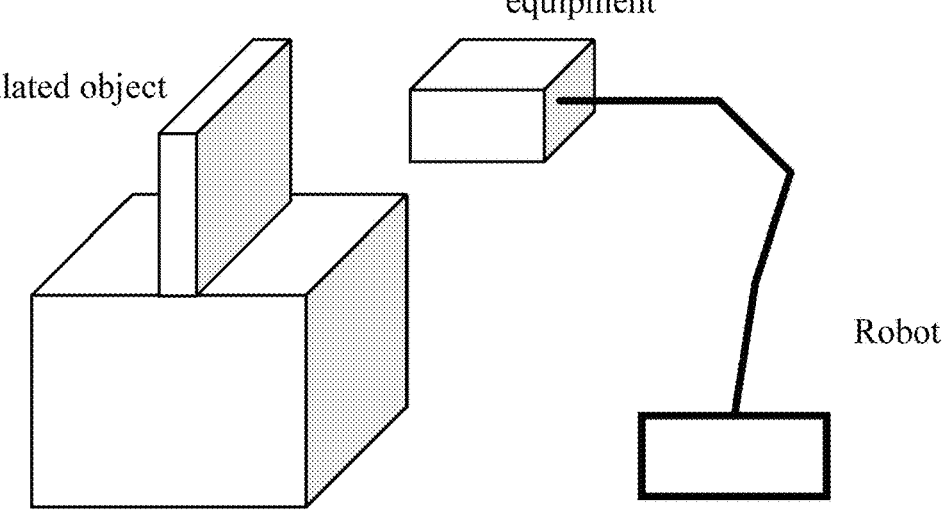
FIG. 6 is a diagram of a virtual simulation platform.

The measured object is a 600 mm×450 mm×200 mm cuboid. Firstly, establishing a 1:1 virtual simulation platform on a computer, which has been installed an Ubuntu operating system and an open source robot operating system (ROS) according to a real measurement environment. In the example, the virtual simulation platform is shown in FIG. 6. A structured light measuring equipment and a depth camera, which are the same as that of real measurement environment are installed on the fixture of the robot's end flange. The robot is a six degrees of freedom (DOF) robot. Then, planning measurement paths on the virtual simulation platform according to the method described in Step 2. After a measurement surface is completed, another measurement surface is selected to perform according to the method described in Step 2, until all measurement paths of all measurement surfaces are planned. The messages of the planned measurement paths are sent to the six DOF robot of real measurement environment.

In the real measurement environment, the checkerboard (calibration board) is 8×11 with square size of 15 mm.

In the example, Firstly, operating the six DOF robot to carry the binocular camera of the structured light measuring equipment to 9 different measurements poses and taking 9 calibration board images with resolutions of 3000×4096. Then, according to the calibration method of Zhang, calculating 9 extrinsic parameter matrices $H_{ci'}$, i'=1, 2, . . . , 9 of the 9 calibration board images, and recording the pose information of the six DOF robot and the position $P_{i'}$, of the corner in camera coordinate system. Meanwhile, calculating 9 robot pose matrix $H_{gi}$=1, 2, . . . , 9. Thus 36 hand-eye calibration equations to be solved are established.

Then, based on the properties of Kronecker product, transforming the hand-eye calibration equation into a least squares problem, and calculating the hand-eye matrix $H_{cg}$ by using a singular value decomposition. In the example, the hand-eye matrix $H_{cg}$ is:

$$H_{cg} = \begin{bmatrix} R_{cg} & T_{cg} \\ 0 & 1 \end{bmatrix} = \begin{bmatrix} 0.0429661 & 0.9988763 & 0.0200075 & 20.1263 \\ -0.9990677 & 0.0428734 & 0.0050404 & 166.462 \\ 0.0041772 & -0.0201986 & 0.9997872 & 361.342 \\ 0 & 0 & 0 & 1 \end{bmatrix}$$

Where the rotation matrix of the hand-eye matrix $H_{cg}$ is the matrix of 3×3 of the left upper corner, namely:

$$R_{cg} = \begin{bmatrix} 0.0429661 & 0.9988763 & 0.0200075 \\ -0.9990677 & 0.0428734 & 0.0050404 \\ 0.0041772 & -0.0201986 & 0.9997872 \end{bmatrix}$$

the translation vector of the hand-eye matrix $H_{cg}$ is the column vector of 3×1 of the right upper corner, namely:
the rotation matrix of the hand-eye matrix $H_{cg}$ is the matrix of 3×3 of the left upper corner, namely:

$$T_{cg} = \begin{bmatrix} 20.1263 \\ 166.462 \\ 361.342 \end{bmatrix}$$

The calculated hand-eye matrix $H_{cg}$ is taken as the initial position of the subsequent particle swarm optimization algorithm. In the example, the all positions of K' particles in initial population are the calculated hand-eye matrix $H_{cg}$.

In the example, the optimized hand-eye matrix $$H_{cg}^{revised}$$

is:

$$H_{cg}^{revised} = \begin{bmatrix} 0.043376 & 0.998763 & 0.0203564 & 19.6059 \\ -0.998952 & 0.0452435 & -0.00692214 & 162.861 \\ -0.00599257 & -0.0206492 & 0.9997669 & 350.159 \\ 0 & 0 & 0 & 1 \end{bmatrix}$$

Figure 7:
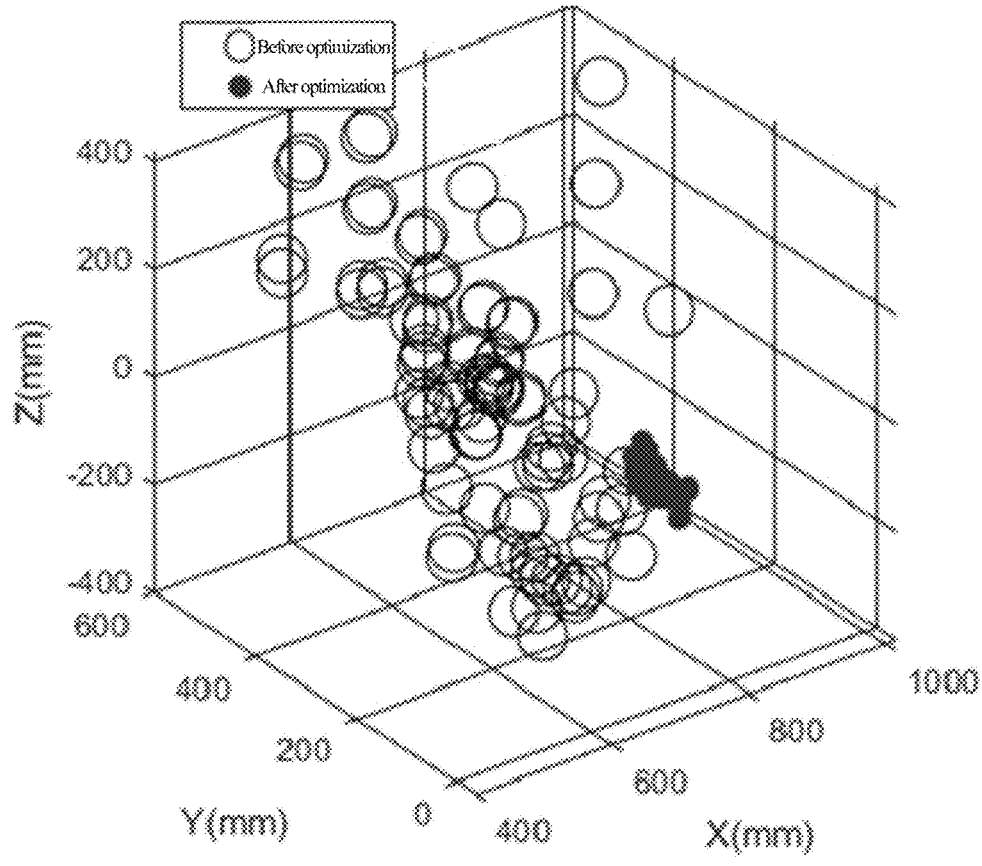
FIG. 7 is a comparison chart of the position distribution of calibration origins after and before optimization.

As shown in FIG. 7, after optimizing the hand-eye matrix $H_{cg}$ through the particle swarm optimization algorithm, we can calculate the position of calibration origin under the robot base coordinate system. Comparing the position distribution of calibration origins of n' measurement poses, we can see that calibration origins (black dots) after optimization are relatively concentrated and almost overlapped; however calibration origins (hollow dots) before optimization are relatively dispersed. The comparison proves the improvement of hand-eye calibration, and the effect will be verified in subsequent 3D measurement.

Figure 8:
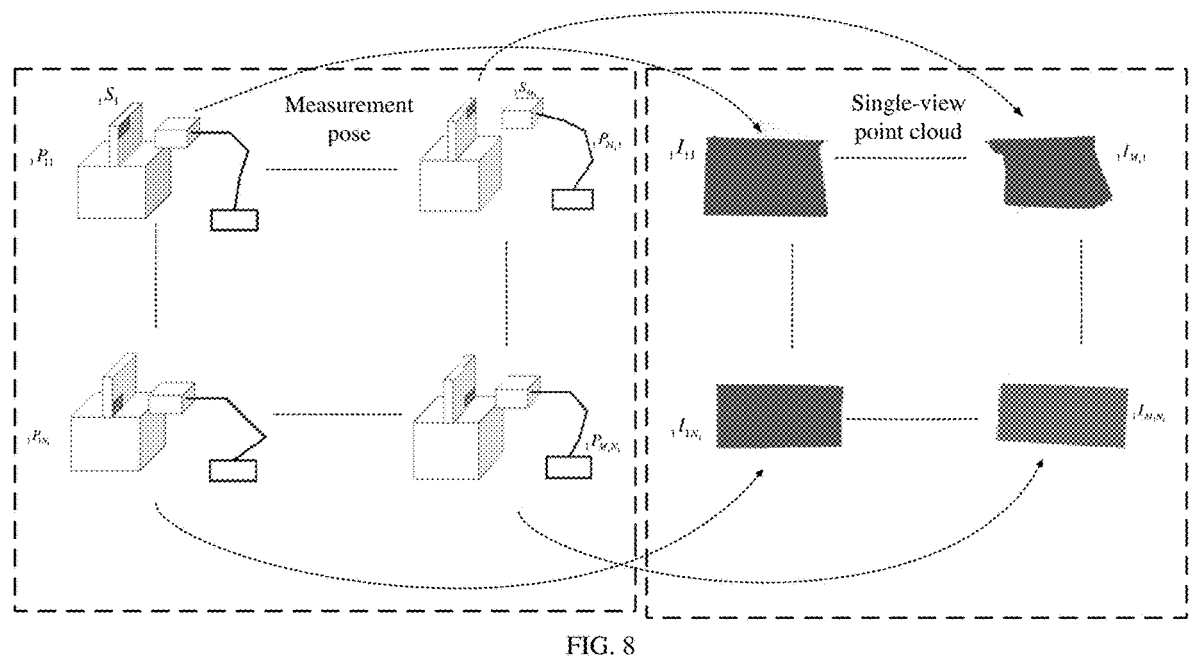
FIG. 8 is a diagram of the measurement poses and corresponding single-view point clouds on one measurement surface of the measured object in example 1.
Figure 10:
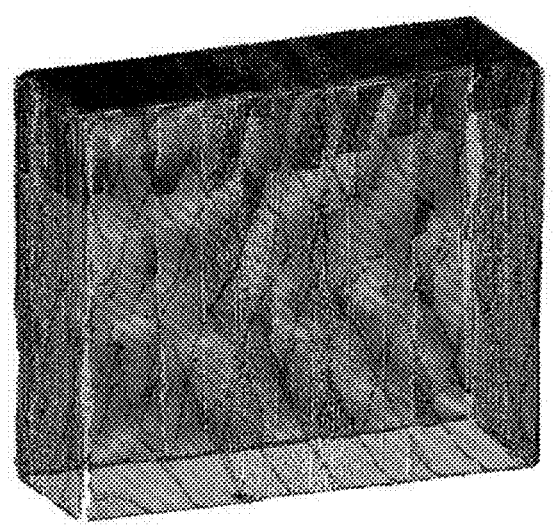
FIG. 10 is an illustration of complete point cloud of the measured object in example 1.

After the optimized hand-eye matrix $$H_{cg}^{revised}$$

is obtained, the six DOF robot carries the structured light measuring equipment to a measurement pose according to the planned measurement paths to taking imagines of the measured object, then a single-view point cloud of the measured object is obtained. The measurement poses and corresponding single-view point clouds on the $1^{st}$ measurement surface (k=1) of the measured object are shown in FIG. 8, and registered single-view point clouds of measurement surfaces in robot base coordinate system are shown in FIG. 9. For FIG. 8 and FIG. 9, we can see that the single-view point clouds of the same measurement surface can be registered. As shown in FIG. 10, a complete point cloud of the measured object is obtained through the present invention.

Example 2

Figure 11A:
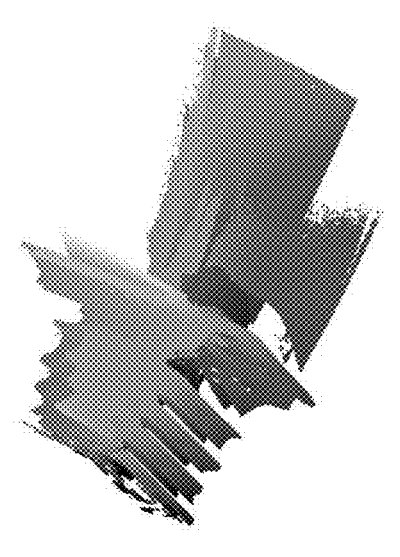
FIG. 11(A) is an illustration of complete point cloud of not optimizing the hand-eye matrix of another measured object in example 2.
Figure 11B:
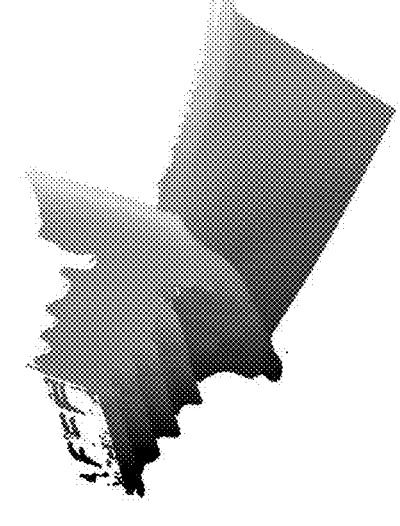
FIG. 11(B) is an illustration of complete point cloud of optimizing the hand-eye matrix of another measured object in example 2.

In the example, the measured object is complex mechanical component. As shown in FIG. 11, the complete point cloud after optimizing the hand-eye matrix can embody more shape characteristics, which means that the complete point cloud after optimizing the hand-eye matrix can represent more abundant surface information and is beneficial to perform the subsequent process of point cloud high efficiently.

While illustrative embodiments of the invention have been described above, it is, of course, understand that various modifications will be apparent to those of ordinary skill in the art. Such modifications are within the spirit and scope of the invention, which is limited and defined only by the appended claims.

What is claimed is:

1. A method comprising:

step 1: establishing a virtual simulation platform step 1.1:

based on a real measurement environment, establishing the virtual simulation platform on a computer with an open source robot operating system (ROS), importing a description file of a real robot of the real measurement environment into the virtual simulation platform to create a virtual robot in the virtual simulation platform, the virtual robot having the same links, joints, kinematics, and dynamic parameters as the real robot, and on the virtual simulation platform, installing virtual structured light measuring equipment and a virtual depth camera that correspond to real structured light measuring equipment and a binocular camera in the real measurement environment on a virtual fixture of the virtual robot's end flange;

step 1.2:

simulating a measured object to create a simulated object and placing the simulated object right in front of the virtual robot and the virtual structured light measuring equipment, determining multiple measurement surfaces of the simulated object and multiple measurement paths on each measurement surface for image taking of the simulated object by the virtual structured light measuring equipment, wherein an $i^{th}$ measurement path of a $k^{th}$ measurement surface is denoted by $_kS_i$ $k=1$, $2, \ldots, K$, $i=1, 2, \ldots, M_k$, K is the number of measurement surfaces, $M_k$ is the number of measurement paths of the $k^{th}$ measurement surface, wherein a $j^{th}$ measurement point, namely measurement pose of the $i^{th}$ measurement path of the $k^{th}$ measurement surface is denoted by $_kP_{i,j}$, $j=1, 2, \ldots, N_k$, $N_k$ is a number of measurement poses of a measurement path of the $k^{th}$ measurement surface; and a view field of the virtual structured light measuring equipment is a rectangle with a length of m cm and a width of n cm, an outer rectangle of the $k^{th}$ measurement surface is $_ka$ in length and $_kb$ in width, the measurement paths are vertical strips along a length, which satisfy the following constraints:

any two adjacent measurement paths have a strip of common area, the number $M_k$ of measurement paths of the $k^{th}$ measurement surface is greater than or equal to $_ka/m$, the number $N_k$ of the measurement poses of a measurement path of the $k^{th}$ measurement surface is greater than or equal to $_kb/n$, and the $j^{th}$ measurement pose $_kP_{ij}$ of the $i^{th}$ measurement path of the $k^{th}$ measurement surface is obtained according to the constraints;

step 2: planning measurement paths on the virtual simulation platform step 2.1:

on the virtual simulation platform, to the $i^{th}$ measurement path of the $k^{th}$ measurement surface, dragging an arm end of the virtual robot to a measurement pose $_kP_{ij}$, wherein the measurement pose $_kP_{ij}$ is $(_kPx_{ij}, _kPy_{ij}, _kPz_{ij}, _kRx_{ij}, _kRy_{ij}, _kRz_{ij})$, $(_kPx_{ij}, _kPy_{ij}, _kPz_{ij})$ being a position coordinate of the arm end of the virtual robot, and $(_k Rx_{ij}, _kRy_{ij}, _kRz_{ij})$ being an attitude coordinate of the arm end of the virtual robot;

step 2.2:

in sequence:

taking a RGB-D image of the simulated object at the measurement pose $_kP_{ij}$ by the virtual depth camera and converting the RGB-D image into a grayscale image, filtering out a background of the RGB-D image by using threshold segmentation and extracting a contour from the RGB-D image to obtain a minimum circumscribed rectangle of the simulated object, traversing depths of all pixels of the RGB-D image within the minimum circumscribed rectangle to find out a shortest distance $d_{min}$ between the simulated object and the virtual structured light measuring equipment and recording a pixel coordinate $(u,v)$ that corresponds to the shortest distance $d_{min}$ on the RGB-D image, judging whether the shortest distance $d_{min}$ satisfies a measurement range of the virtual structured light measuring equipment using the equation $d_{min} \in [D-\delta, D+\delta]$, wherein D is a focal length of the virtual structured light measuring equipment for camera calibration and $\delta$ is an allowable measurement error range of the virtual structured light measuring equipment;

step 2.3:

in response to judging that the shortest distance $d_{min}$ does not satisfy the measurement range of the virtual structured light measuring equipment, in sequence:

obtaining a corresponding spatial coordinate $(x_{(u,v)}, y_{(u,v)}, z_{(u,v)})$ of the pixel coordinate $(u,v)$ through a coordinate transformation, determining a spatial line according to the spatial coordinate $(x_{(u,v)}, y_{(u,v)}, z_{(u,v)})$ and the position coordinate $(_kPx_{ij}, _kPy_{ij}, _kPz_{ij})$ of the arm end of the virtual robot using the equation:

$$\frac{x - _k Px_{ij}}{x_{(u,v)} - _k Px_{ij}} = \frac{y - _k Py_{ij}}{y_{(u,v)} - _k Py_{ij}} = \frac{z - _k Pz_{ij}}{z_{(u,v)} - _k Pz_{ij}}$$

wherein $(x,y,z)$ is a spatial coordinate on the spatial line; finding a position coordinate from the position coordinate $(_kPx_{ij}, _kPy_{ij}, _kPz_{ij})$ on the spatial line to obtain a position coordinate $(_k\tilde{p}x_{ij}, _k\tilde{p}y_{ij}, _k\tilde{p}z_{ij})$, which satisfies the following measurement conditions:

$$\begin{cases} \tilde{d}_{min} = \sqrt{\left(_k\tilde{p}x_{ij} - x_{(u,v)}\right)^2 + \left(_k\tilde{p}y_{ij} - y_{(u,v)}\right)^2 + \left(_k\tilde{p}z_{ij} - z_{(u,v)}\right)^2} \\ \tilde{d}_{min} \in [D - \delta, D + \delta] \end{cases},$$

and combining the position coordinate $(_k\tilde{p}x_{ij}, _k\tilde{p}y_{ij}, _k\tilde{p}z_{ij})$ with the attitude coordinate $(_kRx_{ij}, _kRy_{ij}, _kRz_{ij})$ to form a measurement pose $(_k\tilde{p}x_{ij}, _k\tilde{p}y_{ij}, _k\tilde{p}z_{ij}, _kRx_{ij}, _kRy_{ij}, _kRz_{ij})$ and updating the measurement pose $_kP_{ij}$ with the measurement pose $(_k\tilde{p}x_{ij}, _k\tilde{p}y_{ij}, _k\tilde{p}z_{ij}, _kRx_{ij}, _kRy_{ij}, _kRz_{ij})$;

step 2.4:

in response to judging that the shortest distance $d_{min}$ satisfies the measurement range of the virtual structured light measuring equipment, recording the measurement pose $_kP_{ij}$ and going to step 2.1 for judging a next measurement pose $_kP_{i(j+1)}$ until the shortest distances of all measurement poses of the measurement path $_kS_i$ are judged;

step 2.5:

in response to the shortest distances of all measurement poses of the measurement path $_kS_i$ being judged, evaluating the measurement path $_kS_i$ step 2.5.1:

executing the measurement path $_kS_i$ on the virtual simulation platform, the virtual robot moving continuously from a measurement pose $_kP_{i1}$ to a measurement pose $_kP_{iN_k}$, sampling and recording a position $_k\dot{P}_{it}$ in equal time during movement, wherein all positions $_k\dot{P}_{it}$=0, 1, . . . , T form a motion path $_k\dot{S}_i$, t is a serial number of sampling, and T is a number of samplings;

calculating a shortest distance $l_1$ between a starting position $(_kPx_{i1}, _kPy_{i1}, _kPz_{i1})$ and an ending position $(_kPx_{iJ}, _kPy_{iJ}, _kPz_{iN_k})$ of the measurement path $_kS_i$ using the equation:

$$l_1 = \sqrt{\left(_kPx_{i1} - _kPx_{iN_k}\right)^2 + \left(_kPy_{i1} - _kPy_{iN_k}\right)^2 + \left(_kPz_{i1} - _kPz_{iN_k}\right)^2}$$

calculating a motion distance between the starting position $(_k\dot{P}x_{i1}, _k\dot{P}y_{11}, _k\dot{P}z_{i1})$ and the ending position $(_k\dot{P}x_{iT}, _k\dot{P}y_{iT}, _k\dot{P}z_{iT})$ of the motion path $_k\dot{S}_i$ using the equation:

$$l_2 = \sum_{t=1}^{T-1} \sqrt{\left(_k\dot{P}x_{i(t+1)} - _k\dot{P}x_{it}\right)^2 + \left(_k\dot{P}y_{i(t+1)} - _k\dot{P}y_{it}\right)^2 + \left(_k\dot{P}z_{i(t+1)} - _k\dot{P}z_{it}\right)^2},$$

and obtaining a distance difference L, wherein L=$l_2$–$l_1$, and creating an evaluation function $f_1(L)$, wherein $f_1(L)$=$(\delta_1$–L$)/\delta_1$, 0≤L≤$\delta_1$, $\delta_1$ is a maximum error threshold;

step 2.5.2:

in sequence:

finding a position $_k\dot{P}_{iw}$ which has a shortest distance to a barycenter of the simulated object from the motion path $_k\dot{S}_i$, wherein the shortest distance is denoted by $l_3$, and creating an evaluation function $f_2(l_3)$, wherein $f_2(l_3)$=$(l_3$–$\delta_2)/l_3$, $\delta_2$ is a shortest distance which guarantee no collision between the virtual structured light measuring equipment and the simulated object;

step 2.5.3:

in sequence:

creating an overall evaluation function $_kF_i$ for the measurement path $_kS_i$, wherein $_kF_i$=$(0.5f_1(L)$+$0.5f_2(l_3))$*100, determining that the measurement path $_kS_i$ has passed an evaluation according to the overall evaluation function $_kF_i$ when the overall evaluation function $_kF_i$>g, wherein g is a threshold which is determined by measurement operator according to an actual measurement scenario, and 0<g<100;

step 2.6:

in response to the measurement path $_kS_i$ not passing the evaluation, in sequence:

traversing all measurement poses of the measurement path $_kS_i$ to find a measurement pose $_kP_{is}$ which has a shortest distance to position $_kP_{iw}$, moving the virtual robot to the measurement pose $_kP_{is}$, dragging the arm end of the virtual robot to manually increase the shortest distance $d_{min}$ between the simulated object and the virtual structured light measuring equipment, wherein the increase of the shortest distance $d_{min}$ satisfies the measurement range of the virtual structured light measuring equipment: $d_{min}\in[D-\delta,D+\delta]$, replacing the measurement pose $_kP_{is}$ with a measurement pose after the increase of the shortest distance $d_{min}$ to complete a correction of the measurement path $_kS_i$, and going to step 2.7;

step 2.7:

in response to the measurement path $_kS_i$ passing the evaluation, for each measurement path of each measurement surface, performing step 2.1 to step 2.6 to complete the simulation of planning of the measurement paths, converting the planned measurement paths into communication messages that are recognized by the real robot, and sending the communication messages from the virtual simulation platform to the real robot in the real measurement environment;

step 3: measuring in a real measurement environment step 3.1: establishing a hand-eye calibration equation in sequence:

in the real measurement environment, installing the real structured light measuring equipment on a fixture of an end flange of the real robot, operating the real robot to move to an $i'^{th}$ measurement pose and taking an image of a corner of a checkerboard, namely a calibration board to obtain a calibration board image, recording the pose information of the real robot and the position $P_{i'}$ of the corner in camera coordinate system, for n' measurement poses, obtaining n' calibration board images, and their corresponding pose information of the real robot and positions $P_{i'}$ of the corner in camera coordinate system;

in sequence:

obtaining a rotation matrix $R_{ci'}$ and a translation vector $T_{ci'}$ of the calibration board relative to the binocular camera of the real structured light measuring equipment in each calibration board image according to a Zhang calibration method, combining the rotation matrix $R_{ci'}$ and the translation vector $T_{ci'}$ into an extrinsic parameter matrix $H_{ci'}$, i'=1, 2, . . . ,n', and obtaining the rotation matrix $R_{gi'}$ and the translation vector $T_{gi'}$ of the end flange of the real robot relative to a base of the real robot according to the measurement pose, and combining the rotation matrix $R_{gi'}$ and the translation vector $T_{gi'}$ into a robot pose matrix $H_{gi'}$, i'= 1, 2, . . . , n', where:

$$H_{ci'} = \begin{bmatrix} R_{ci'} & T_{ci'} \\ 0 & 1 \end{bmatrix},$$

$$H_{gi'} = \begin{bmatrix} R_{gi'} & T_{gi'} \\ 0 & 1 \end{bmatrix};$$

establishing a hand-eye calibration equation based on the extrinsic parameter matrices $H_{cu'}$, $H_{cv'}$ and robot pose matrices $H_{gu'}$, $H_{gv'}$ of any two measurement poses based on the equation:

$$[H_{gv'}^{-1} H_{gu'}] H_{cg} = H_{cg}[H_{cv'} H_{cu'}^{-1}]$$

wherein $H_{cg}$ is a hand-eye matrix, u', v' are serial numbers of any two measurement poses, u'$\neq$v' and:

$$[H_{gv'}^{-1} H_{gu'}] = \begin{bmatrix} R_{gu',v'} & T_{gu',v'} \\ 0 & 1 \end{bmatrix},$$

$$H_{cg} = \begin{bmatrix} R_{cg} & T_{cg} \\ 0 & 1 \end{bmatrix} \text{ and}$$

$$[H_{cv'} H_{cu'}^{-1}] = \begin{bmatrix} R_{cu',v'} & T_{cu',v'} \\ 0 & 1 \end{bmatrix};$$

wherein $R_{gu',v'}$ is the rotation matrix of the matrix $$[H_{gv'}^{-1} H_{gu'}], T_{gu'v'}$$

is the translation vector of the matrix $$[H_{gv'}^{-1} H_{gu'}], R_{cg}$$

is the rotation matrix of the hand-eye matrix $H_{cg}$, $T_{cg}$ is the translation vector of the hand-eye matrix $H_{cg}$, $R_{cu',v'}$ is the rotation matrix of the matrix $$[H_{cv'} H_{cu'}^{-1}],$$

is the translation vector of the matrix $$[H_{cv'} H_{cu'}^{-1}];$$

step 3.2:
    based on properties of a Kronecker product, transforming the hand-eye calibration equation into a least squares problem, and calculating the hand-eye matrix $H_{cg}$ by using a singular value decomposition; establishing a linear equation set:

$$\left(R_{gu',v'} \otimes I - I \otimes R_{cu',v'}^T\right) \cdot vec(R_{cg}) = 0,$$

wherein I is a unit matrix, $\otimes$ is an operator of Kronecker product, vec is the operator of vectorization;
    placing all matrices $$\left(R_{gu',v'} \otimes I - I \otimes R_{cu',v'}^T\right)$$

of all any two measurement poses by column to obtain a matrix R;

performing a singular value decomposition on the matrix R to obtaining a matrix V, namely the right singular matrix of the matrix R, and taking out the 9 elements of last column of the matrix V to revert to a matrix $\overline{R}_{cg}$ of 3×3;
performing a singular value decomposition on the matrix $\overline{R}_{cg}$, i.e.

$$\overline{R}_{cg} = U_R \sum_R V_R^T,$$

wherein $U_R$ is the left singular matrix of the matrix $\overline{R}_{cg}$, $\Sigma_R$ is the singular value matrix of the matrix $\overline{R}_{cg}$, $V_R$ is the right singular matrix of the matrix $\overline{R}_{cg}$, then obtaining the rotation matrix $R_{cg}$ of the hand-eye matrix $$H_{cg}: R_{cg} = U_R V_R^T;$$

placing all matrices $(R_{gu',v}-I)$ of all any two measurement poses by column to obtain a matrix $R_g$, placing all matrices $(R_{cg}T_{cu',v}-T_{gu',v})$ of all any two measurement poses by column to obtain a matrix T', and calculating the translation vector of the hand-eye matrix $$H_{cg}: T_{cg} = R_g^{-1} T'$$

step 3.3:
    based on minimizing a reprojection error, optimizing the hand-eye matrix $H_{cg}$ by using a particle swarm optimization algorithm
step 3.3.1:
    creating a particle swarm with a population size of K', wherein the position and the velocity of a $k'^{th}$ particle are denoted by $p_{k'}$ and $v_{k'}$, respectively, then initializing the positions $p_{k'}$ and the velocities $v_{k'}$ of all K' particles:

$$p_k = H_{cg}$$

$$v_k = \text{rand}(v_{min}, v_{max})$$

wherein k'=1, 2, . . . , K', $v_{min}$, $v_{max}$ are an upper threshold and a lower threshold of velocity at each iteration of particle and rand( ) is rand function;
step 3.3.2:
    establishing a reprojection error cost function as the fitness function of the particle swarm optimization algorithm:

$$\varphi(p_{k'}) = \sum_{i'=1, j' \neq i'}^{n'} \left\| P_{i'} - \frac{1}{s_{i'}} K^* \exp\left[p_{k'} H_{gj'} H_{gi'}^{-1} p_{k'}^{-1}\right]_{3 \times 4} P_{j'} \right\|_2^2$$

wherein $s_{i'}$ is the scale factor of the $i'^{th}$ measurement pose, K* is the intrinsic parameter matrix of the binocular camera, $\exp[\bullet]_{3\times4}$ is an operator of choosing a submatrix of 3×4 of the left upper corner of the matrix in square bracket, $\| \ \|_2$ is a square-normal operator, and $P_{j'}$ is the position of the corner of the checkerboard of any non-$i^{th}$ measurement pose in camera coordinate system;

step 3.3.3:

according to the fitness function $\varphi(p_{k'})$, finding a position of a current individual extremum min $$\{\varphi(p_{k'}), \varphi(p_{k'}^*)\}$$

of each particle and taking it as a historical optimal position $$p_{k'}^*,$$

finding a position of a global extremum min $\{\varphi(p_{k'}), k'= 1, 2, \ldots, K'\}$, namely the position of the particle of the minimum value of fitness functions and taking it as a global optimal position g*

$$\begin{cases} p_{k'}^* \leftarrow \min\{\varphi(p_{k'}), \varphi(p_{k'}^*)\} \\ g^* \leftarrow \min\{\varphi(p_{k'}), k' = 1, 2, \ldots, K'\} \end{cases}$$

step 3.3.4:

updating the velocity $v_{k'}$ and position $p_{k'}$ of each particle:

$$\begin{cases} v_{k'} = \omega v_{k'} + c_1 rand(0, 1) \times (p_{k'}^* - p_{k'}) + c_2 rand(0, 1) \times (g^* - p_{k'}) \\ p_{k'} = p_{k'} + v_{k'} \end{cases}$$

wherein $\omega$ is an inertia factor, $c_1$ and $c_2$ are acceleration factors;

returning to step 3.3.3 until a termination condition is reached;

step 3.3.5:

taking the global optimal position g* as an optimized hand-eye matrix, which is denoted by $$H_{cg}^{revised};$$

step 3.4: performing a 3D measurement
step 3.4.1:

adjusting the binocular camera of the real structured light measuring equipment so that it clearly captures the measured object, with left and right cameras being kept in the same horizontal position with a certain distance, thereby completing binocular calibration;

adjusting the real robot so that it carries the real structured light measuring equipment to perform the 3D measurement and guarantee the full view of the measured object will be taken;

step 3.4.2:

after receiving the planned measurement paths from the virtual simulation platform, moving the real robot in turn to the measurement poses of the planned measurement paths;

step 3.4.3:

in sequence:

for a measurement pose $_kP_{ij}$, calculating a pose matrix $$_kH_{ij}^g$$

from the coordinate system of the end flange of the real robot to a real robot base coordinate system according to the measurement pose $_kP_{ij}$, then obtaining a rigid body transformation matrix:

$$_kH_{ij}^{pcl} = {_kH_{ij}^g} * H_{cg}^{revised}$$

obtaining a single-view point cloud $_kI_{ij}$ of the measured object through the binocular camera of the real structured light measuring equipment and transforming the single-view point cloud $_kI_{ij}$ of the measured object from the camera coordinate system to the real robot base coordinate system to obtain a registered single-view point cloud $$_kI_{ij}^{homo} : {_kI_{ij}^{homo}} = {_kH_{ij}^{pcl}} * {_kI_{ij}}$$

wherein when registered single-view point clouds of all measurement poses are obtained, the points under the real robot base coordinate system form a complete point cloud of the measured object, the 3D measurement is completed.

* * * * *